United States Patent
Palotai et al.

(10) Patent No.: US 8,055,095 B2
(45) Date of Patent: Nov. 8, 2011

(54) PARALLEL AND ADAPTIVE SIGNAL PROCESSING

(75) Inventors: Zsolt Palotai, Veresegyház (HU); András Lőrincz, Nagykovácsi (HU)

(73) Assignee: Sparsense, Inc., Boca Raton, FL (US)

(*) Notice: Subject to any disclaimer, the term of this patent is extended or adjusted under 35 U.S.C. 154(b) by 858 days.

(21) Appl. No.: 12/062,757

(22) Filed: Apr. 4, 2008

(65) Prior Publication Data

US 2009/0185636 A1    Jul. 23, 2009

Related U.S. Application Data

(60) Provisional application No. 61/023,026, filed on Jan. 23, 2008.

(51) Int. Cl.
*G06K 9/36* (2006.01)
*H04B 15/00* (2006.01)
(52) U.S. Cl. .................... 382/276; 375/285
(58) Field of Classification Search .......... 382/232, 382/100, 248, 276, 302; 702/189–191; 341/87; 375/285
See application file for complete search history.

(56) References Cited

U.S. PATENT DOCUMENTS

| | | | |
|---|---|---|---|
| 6,556,958 B1* | 4/2003 | Chickering | 703/2 |
| 6,622,117 B2* | 9/2003 | Deligne et al. | 702/190 |
| 6,836,569 B2* | 12/2004 | Le Pennec et al. | 382/260 |
| 7,286,712 B2* | 10/2007 | Lee et al. | 382/248 |
| 2006/0029279 A1 | 2/2006 | Donoho | |

FOREIGN PATENT DOCUMENTS

WO    WO 2007/050953    5/2007

OTHER PUBLICATIONS

Lustig et al, "Sparse MRI: The Application of Compressed Sensing for Rapid MR Imaging", Magnetic Resonance in Medicine 58(6), pp. 1182-1195, Dec. 2007.*
Interantional Search Report and Written Opinion for PCT/US93/31507, dated Mar. 12, 2009.

* cited by examiner

*Primary Examiner* — Yon Couso
(74) *Attorney, Agent, or Firm* — Fliesler Meyer LLP

(57)    ABSTRACT

A method and apparatus for parallel and adaptive signal reconstruction from a multitude of signal measurements. Algorithms and hardware are disclosed to denoise the measured signals, to compress the measured signals, and to reconstruct the signal from fewer measurements than standard state-of-the-art methods require. A parallel hardware design is disclosed in which the methods that are described can be efficiently executed.

81 Claims, 15 Drawing Sheets

```
Inputs
    y: the sample to be reconstructed
    Q, W: matrices mapping from s to x and from x to s
    H: similarity measure matrix of components of s
    N, n, ε: maximal sample number, iteration number, reconstruction error
    p, η, χ(.): probabilities, p tuning rate, indicator function
    θ, δ, ρ: elite threshold, elite threshold tuning rate, elite percentage
    γ, κ, c₁, c₂, c₃, c₄ : parameters
```

```
Initialize
S202    p=W|y|, s₀=W|y|, θ=1, V_best=inf, C=exp(-κ./H)
S203    for N times
S204        p_choose=p+Cp
S205        idxs: set of component indices
                index i is in idxs with probability p_choose,i
                only k_c indices can be in idxs from each cluster
S206        s_idxs=s_0,idxs
            e=||y-Q.,idxsS_idxs||_L2
            for maximum n iterations and while e>ε
                s_idxs=s_idxs+γW_idxs(y-Q.,idxsS_idxs)
                e=||y-Q.,idxsS_idxs||_L2
            end for
S207        V= c₄e
            For each cluster in which there is
                at least one active component
                    q = |s_cluster|/||s_cluster||_L1
                    V = V + exp(Σ(q logq))
            End for
S208        If V<θ
                θ=θ-δ
S209            s_0,idxs=(1-c₃)s_0,idxs+c₃s_idxs
S210, S211
                ss = |s|/max|s|
                p=(1-η)p + χ(s)η./(1+exp(-c₁(ss-c₂)))
            End if
S208        If V>θ then θ=θ+ρδ end if
S212        If V<V_best
                Remember s and V_best =V
                If k or fewer nonzero components are selected
                    and e<ε
                        Stop iteration and return the best s
                End if
            End if
        End for
```

Fig. 4

```
Inputs
    y: the sample to be reconstructed
    Q, W: matrices mapping from s to x and from x to s
    M: measure based on conditional joint activation probability
    p_0: probability of activation of 1 component within a cluster
    r, χ(.): the initial usage rates of the components, indicator function
    θ, δ, ρ: reconstruction error threshold, tuning rate, percentage
    α_0, β, c_0, c_1, c_2 : parameters
```

```
Initialize
S002    s=sparse code for y
S003    s=the k largest components of s remain nonzero
        e=x-Qs
S004    r=(1-β)r+βχ(s)
S005    For each active component i in s
            If ||e||_L2<θ_i then θ_i=θ_i-δ
            Else θ_i=θ_i+ρδ
            End if
        End for
S006    M update, i,j: active components in clusters C_1 and C_2
        M_i,d=(1-β)M_i,d + r_uβp_0, d: components of C_2
        M_j,b=(1-β)M_j,b + r_uβp_0, b: components of C_1
        M_i,i=M_i,j - β(1-p_0)
        M_j,i=M_j,i - β(1-p_0)
S007    α_i=α_0, i=1..m
        α_i=α_i/c_0, θ_i<well tuned threshold, i=1..m
S008    Q=Q+(y-Qs)(α.*s)^T
        W=W+(α.*(s-Wy))y^T
S009    idx=argmax(r)
        α=exp(-1*c_1*r), so α is large only for small r
        Q_.,i=(1-α)Q_.,i+αQ_.,idx if r_i<usage threshold, i=1..m
        For each active components i in s
            mc_g=sum(M_i,j), g: clusters but of i
                              j: components in g
            If max(mc) > c_2
                Let j be a not used component in argmax(mc)
                Q_.,j=Q_.,i
                Q_.,i=random component
                Reinitialize measures r, M of components i, j
            End if
        End for
S010    Q_i,j=0 if |Q_i,j|<minimal magnitude, i=1..n,j=1..m
        W_i,j=0 if |W_i,j|<minimal magnitude, i=1..m,j=1..n
        Q_.,i=Q_.,i/||Q_.,i||_L2, i=1..m
```

Fig. 5

PARALLEL AND ADAPTIVE SIGNAL PROCESSING

CLAIM OF PRIORITY

This application claims priority to U.S. Provisional Application No. 61/023,026 entitled "PARALLEL AND ADAPTIVE SIGNAL PROCESSING" by Zsolt Palotai et al., filed Jan. 23, 2008, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to digital signal processing and more particularly to the reconstruction of signals from a multitude of signal measurements.

BACKGROUND OF THE INVENTION

Digital signal processing is undertaken or used in many every day life devices, as well as in many special purpose devices, such as medical imaging devices.

In signal processing, both a signal to be measured and the measurement process itself may contain and/or contribute noise. It is advantageous to eliminate noise to obtain better signal processing results, such as sharper images. In some applications the process of signal measurement requires a significant amount of time, such as in medical equipment known as MRI. Therefore, it would be also advantageous to decrease the number of required signal measurements for a given quality of result, as well as achieve the same sharpness and number of pixels with fewer signal measurements.

If a measured signal is to be transferred to some other location, it is also advantageous if the data to be actually sent is as small as possible to lower the required bandwidth, or to increase the rate of sending of complete measurements, such as the frame rate for video signal transmissions.

Sparse representation of signals is a signal processing art in which noise, which can not be represented sparsely, can be filtered out. The sparse representation of a given signal can be estimated from a small number of measurements, where small is compared to the dimension of the signal. Also, a sparse representation generally means that the data is compressed.

There are numerous sparse representation learning algorithms known in the art. These algorithms, however, are not scalable to million dimensional inputs. Also, these algorithms have not been shown to learn the sparse representation that generated the input on artificial data sets; that is, the correctness and convergence of learning is neither demonstrated nor mathematically proven.

There are known hardware designs for operating on large data sets, e.g. large matrix multiplications and neural network simulations. Neural network simulators are known that typically use mixed analog-digital signals, but these make it harder to scale up the hardware. Also, in digital signal operations the bandwidth with which data can be downloaded to the hardware limits the practical size of the hardware.

It is an object of the present invention to provide a method which results in a sparse representation for a measured signal that scales for million dimensional inputs.

It is a further object of the present invention to provide an apparatus that can realize this method.

SUMMARY OF THE INVENTION

The invention provides a method and an apparatus for parallel and adaptive signal reconstruction from a multitude of signal measurements.

Reconstruction is achieved by creating a sparse code of the signal from the measurement values, using as few as possible active components in the code, and reconstructing the original signal from this sparse code. The few active components reduce the energy consumption of the reconstruction process. Sparse code allows for the measurement to be smaller dimensional than the signal to be reconstructed. Sparse code also allows for the measurement and the signal to be corrupted by noise. Furthermore, the sparse code reduces the amount of data to be transmitted to other places, saving bandwidth or increasing the rate of sending of individual signal measurements.

The sparse code calculation is based on selection amongst the components of the sparse code. A sparsity measure is used to determine the sparseness of a code. The sparsity measure is based on the number of active components of the code, with the larger the number of the contributing components, the larger the cost and the less preferred the representation. A sparsity constraint is established based on the sparsity measure to determine if a code is sparse enough. Sparsification of the calculated code then occurs, which sparsification can transform the activations of the components in a non-linear manner.

The main features of the calculation of the present invention are the following:

The sparse representation can be divided into clusters;

The sparse representation can be higher dimensional than the signal to be reconstructed;

The cost function to be minimized contains a function of the nonzero values and the weighted reconstruction error;

During phenotype generation (selection of some components as active components) the preferred components can bring in suppressed components and can suppress non-preferred components;

The activation and suppression is based on the learned or prewired similarity, dissimilarity, probability, etc., measurements of the components of the sparse representation;

The continuous values of the active components are calculated by the iteration of some, e.g., stochastic, variant of the derivative of the cost function that decreases the cost function;

The preferences (to be selected as active components during phenotype generation) of the active components of the best sparse codes are increased according to how important a role they have in the reconstruction of the input; and The phenotype generation stops if a sample reconstructs the input well enough and the sample satisfies the sparsity constraint, or after reaching a maximal iteration number.

The method of the present invention learns appropriate transformations of the signal from the noisy, possibly low dimensional measurements to calculate the sparse code of the signal. These transformations can be prewired if these are known in advance. The method becomes fast, almost feed forward, once the transformations are precise enough. The aim of the adaptation is to improve the reconstruction of the signal with the selected components. The adaptation has nontrivial, necessary additional learning and learning rate tuning. These are the following:

The infrequently used components are tuned to become more frequent; and

The learning rate of each component is adaptive and depends on the performance of the component and the similarity and dissimilarity measurements of the components within the same cluster.

The method of the present invention can be implemented efficiently in a parallel, scalable hardware built from low cost, low power components that run the entire algorithm, including the selection based sparse code calculation. The hardware uses design principles made possible by the method. There is no need to use multiple inputs at a time to improve the cost function and the transformations. One input at a time is satisfactory, but the hardware can be multiplied to use the population of individuals. The hardware stores and updates values as locally as possible to decrease the required bandwidth for data transfer. This enables maximally parallel data processing. The hardware can be redundant so that if a few hardware components fail, then the adaptive property of the method makes it possible to not use those failed components.

In one embodiment of the present invention the measurements are magneto-resonance imaging (MRI) measurements of a patient. The signal to be reconstructed is the MRI image. The invention makes it possible to create less noisy, more detailed images, and to transfer or store the images in a compressed form. Also, with fewer measurements the image acquisition time can be reduced without degrading the quality of images, possibly achieving MR video recordings.

In another embodiment of the present invention the signals are video streams for remote robotic surgery. The invention provides means for transmitting the video streams in a compressed form and for reconstructing the video stream on the receiving side even if some part of the compressed signal is corrupted during transmission. This enables higher resolution, and more detailed videos to be transmitted on the same bandwidth as currently used or the transmission of similar resolution video streams on lower bandwidth channels.

BRIEF DESCRIPTION OF THE DRAWINGS

FIG. 4. is an example of the pseudo code of the sparse code calculation of FIG. 3;

FIG. 5. is an example of the pseudo code of the first method;

DETAILED DESCRIPTION OF THE INVENTION

I. One Method of the Present Invention

Figure 1:
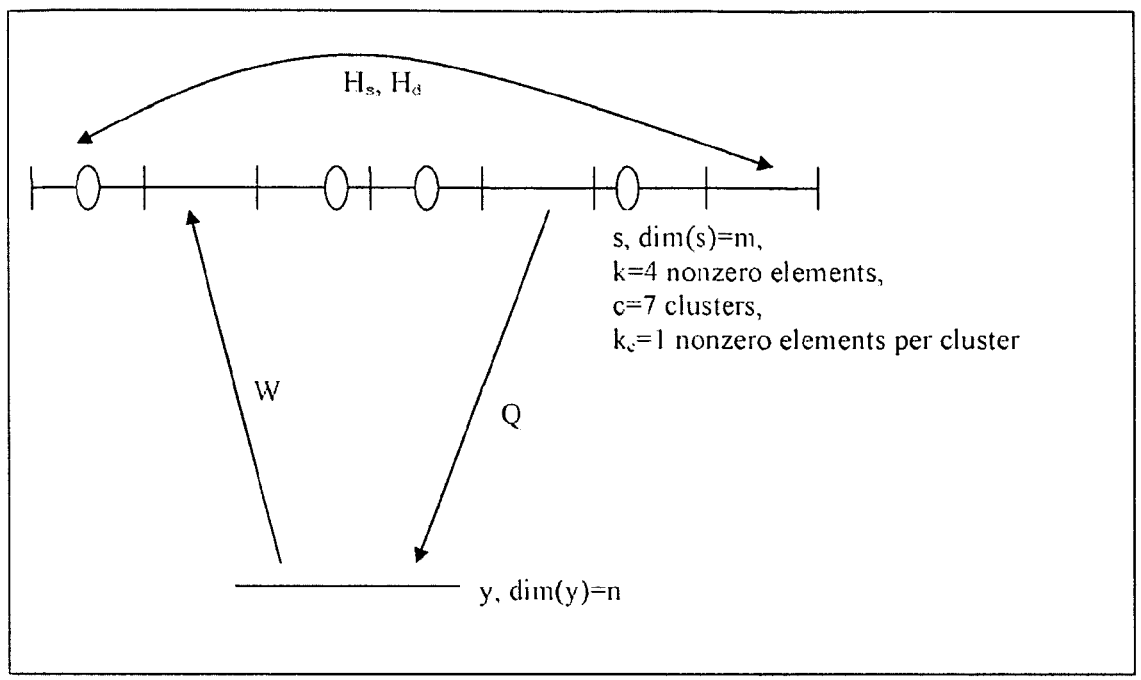
FIG. 1. is an overview of the architecture of a first method of the present invention.

With reference to FIG. 1 which illustrates the architecture and notations of this method, in this embodiment, a signal is measured by an identity transformation. To reconstruct the measured signal, it is sufficient to reconstruct the measurement by the transformations. Particularly, denote the signal measurement as y, the sparse representation as s, the mapping that transforms from s to y by Q, and the mapping that transforms from y to s by W; these are the transformations to be learned or prewired. Denote the dimension of y by n, the dimension of s by m, and the number of maximum nonzero elements in s by k. The following constraints hold: $k \ll n < m$.

Further constraints on the sparse representation may be introduced. The sparse representation possibly may be partitioned into clusters. Thus, denote the number of clusters by c. Furthermore, the maximal number of nonzero elements in a cluster can be $k_c$, $c*k_c >= k$. It is possible to choose c=1 and $k_c$=k; that is there is only one cluster and that contains all of the components. The functions $H_s(i,j)$ and $H_d(i,j)$ estimate the similarity and dissimilarity measures between the components of s. Furthermore, denote the mapping from the $i^{th}$ component of s to y by $Q_i$ and the mapping to the $i^{th}$ component of s from y by $W_i$.

Figure 2:
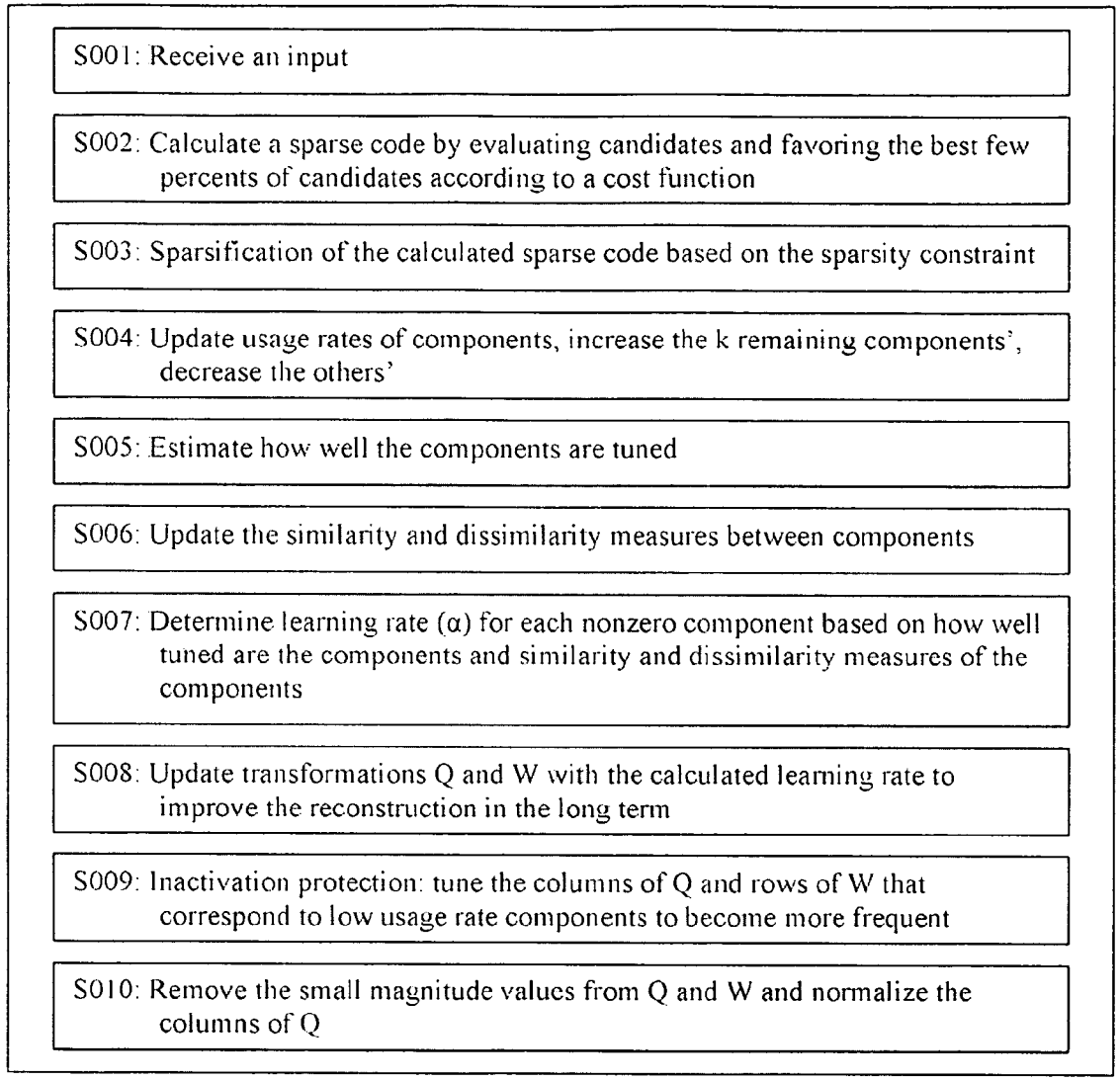
FIG. 2. illustrates the main steps of the first method.

FIG. 2 shows the main steps of the method of FIG. 1, which are as follows: First, an input is received (S001). Then, a sparse code is calculated for the input with the actual Q, W transformations and H functions (S002). Once a sparse code is calculated this code is sparsified based on the sparsity constraint (S003), e.g., it is truncated to the k largest magnitude components, the smaller magnitude components are set to 0, and some of the components of the k largest components may be set to 0 if their values are small. Hereafter, the value "small" means a constant times the actual maximum value, where the constant is, e.g., 0.001. The usage rates of the components are stored (S004) to tune the infrequently used components to become more frequent (S009). To keep the well tuned components, it is estimated how well each component is tuned (S005). Then, similarity and dissimilarity measures between components are maintained (S006). After these measures are updated, the learning rate of components for tuning mappings Q and W are determined (S007). A component's learning rate depends on how well tuned is that component and on the similarity and dissimilarity measure of the components within the same cluster. If a component does not belong to that cluster based on its measures, then its learning rate can be larger. Once the learning rate of each component is determined, transformations Q and W are updated to improve the reconstruction error in the long term (S008). After this, the inactivation protection tunes the infrequently used components to become more frequent (S009).

Finally, the small magnitude values are deleted from Q and W and the columns of Q are normalized (S010).

Figure 3:
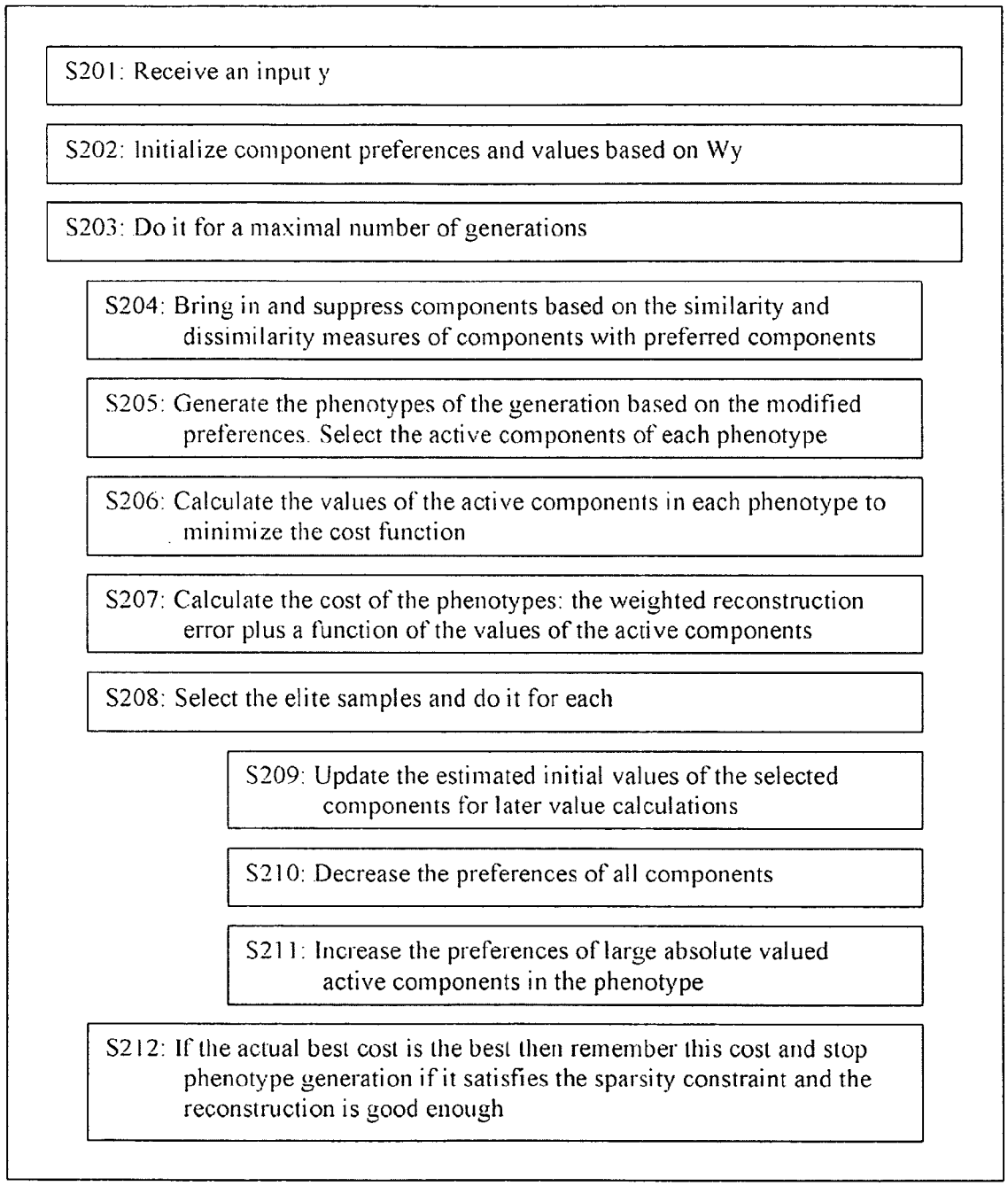
FIG. 3. is an overview of the sparse code calculation of the present invention.

FIG. 3 illustrates in more detail the step (S002) of FIG. 2 in which, as described above, the sparse code s of a given input y is determined by a selection based method (SM) (S002). FIG. 3 shows the main steps of SM. SM tunes the preference of selecting a component of s as an active component based on a cost function (S207). If the actually selected components (phenotype) have a cost function value that belongs to the elite (e.g., the best p percent of cost function values) (S208) then the preferences of those components that have an important role in the reconstruction of the input signal are increased (S211) and the preferences of the other components are decreased (S210). An online SM can estimate the elite set, e.g., by maintaining an elite threshold. If the actual value of the cost function is below the threshold then the actual phenotype is elite, otherwise it is not. The phenotype generation is based on the preferences of the components. The more preferred a component is the more probable that it will be active in a phenotype (S205). Before a phenotype is generated, the preferred components can activate or suppress other components (S204). The activation or suppression is based on the similarity and dissimilarity measures between components. After the active components of a phenotype are selected, the continuous values of the active components of a phenotype are calculated to minimize the cost function (S206). Some calculations enable to initialize the continuous values of the active components. The initial values of components are estimated from the continuous values of the elite phenotypes (S209).

In one particular embodiment of the selection based method SM, a modified online cross-entropy method (CEM) is used. FIG. 4 illustrates an exemplary pseudo code of the sparse code calculation. The modified online CEM works in the following manner. Denote the probabilities of activation of the components of s by p. Denote by C a suitable transformation of $H_s$ that emphasizes the large values, e.g., $C_{i,j} = \exp(-\kappa/H_s(i,j))$, where $\kappa$ is a positive real number. Denote by $\theta$ the actual elite threshold and by $\delta$ the elite threshold update size. In each generation only one phenotype is generated and an elite threshold is maintained to decide whether the actual phenotype is elite. The active components of a phenotype are independently chosen according to their modified probabilities (S205). The activation and suppression is based on H (S204).

An example embodiment is the following: the elements are chosen according to probabilities $p_{choose} = p + Cp$, where $C = \exp(-\kappa./H_s)$, and $\kappa = 1$. Other examples include but are not limiting when $p_i$ is updated by $\Pi_D \Sigma_j C_{ij} p_j$, or $\Sigma_D \Pi_j C_{ij} p_j$, or $\Pi_D \Pi_j C_{ij} p_j$, where D goes through the sets of indices of components of a cluster and j goes through the indices in a D, and any other function of similarity and dissimilarity measures and p, e.g., exp(Cp). Then the continuous values of the selected components in s are calculated (S206). These are determined to minimize, e.g., the L2 norm of the reconstruction error: $\|y-Qs\|_{L2}$.

There can be several embodiments for the calculation: calculate the pseudo inverse of the Q submatrix corresponding to the selected components; solve the linear system only with the selected components, that is, the system is overdetermined and can be solved; iteratively determine the values of the selected components by the iteration of some, e.g., a stochastic, variant of the derivative of the cost function that decreases the cost function, e.g., $s(t+1)=s(t)+\gamma(t)Wf(y-Qs(t))$, $\gamma=0.01$ and $f(.)$ is a possible nonlinearity, for the selected components, stopping the iteration if the error is below a threshold or after reaching an iteration limit number. The latter embodiment allows for a scalable parallel hardware design described herein below. That embodiment also allows initializing the component values by their estimated values.

The estimated values of the components are initialized with Wy in the beginning of phenotype generation and are tuned towards the actually computed values, for example with moving window averaging, after each elite phenotype (S209), where the update rate $c_3$ is, e.g., 0.01. The estimated values can be updated by temporally modifying the W transform to transform the current input y to the values of the elite samples, e.g.: $W(t+1)=W(t)+\alpha(s-W(t)y)y^T$ if s is elite. Another possibility is to use a transform B that calculates the estimated values of active components from Wy, e.g.: BWy gives the initial values of the active components, and B is updated if s is elite: $B(t+1)=B(t)+\alpha(s-B(t)Wy)(Wy)^T$. Next, the cost function is calculated for the actual phenotype, which can be the number of active components in the phenotype plus the weighted reconstruction error (S207). The weight is determined so that the reconstruction error is more important than the first part. If the calculated value is below the actual elite threshold then this phenotype is an elite (S208), otherwise the elite threshold is increased with $\rho\delta$, $\rho=0.05$, $\delta=1e-3$. If the phenotype is elite, then the elite threshold is decreased with $\delta$ and some components' preferences are increased (S211) and all others' preferences are decreased (S210).

A component's preference is increased if it is selected and if its magnitude is in the same order as the largest magnitude of components (S211). An example embodiment of this is the following: $ss=|s|/\max|s|$, $p=(1-\eta)p+\chi(s)\eta./(1+\exp(-c_1*(ss-c_2)))$, $c1=100$, $c2=-0.2$, $\eta=0.01$ and $\chi(.)$ is the indicator function which is 0 where the input is 0, otherwise it is 1. The phenotype generation stops if a given maximum number of phenotypes are reached or if the reconstruction error is below a threshold with at most k selected components (S212). The code with the best cost is remembered and returned as the result.

Once the sparse code is calculated, as shown in FIG. 4, it is sparsified based on the sparsity constraint, e.g. it is truncated to the k largest magnitude components (S003) (FIG. 5). The smaller values are set to 0. This step is required during adaptation when there are not well tuned components. In this case the calculated sparse code is not enough sparse, so the code must be made sparse directly.

There are several measures of the components that should be maintained.

The usage rate of a component is the ratio of inputs in which the component is active. Once the truncated sparse code is obtained the usage rate of the components can be updated (S004) (FIG. 5). The active components' rates are increased and the inactive components' rates are decreased. An example implementation is the following: $r(t+1)=(1-\beta)r(t)+\beta\chi(s)$, where $\beta$ is chosen so that each element in s has a chance to be selected enough times to get an approximately good estimation of usage rates, e.g. $\beta=k/(100m)$, and $\chi(.)$ is the indicator function which is 0 where the argument is 0 and it is 1 otherwise.

It can be estimated in many different ways how well each component is tuned (S005) (FIG. 5). An example is based on the elite cost function threshold. A component is well tuned if it can reconstruct some inputs so that the reconstruction error is low enough. The elite reconstruction error threshold of a component is updated so that a small percent of reconstruction errors (e.g. 5 percent) when the component is active will be under this threshold. That is, if this threshold is small enough then that component can reconstruct some inputs well enough; therefore the component is well tuned. For each active component in the actual sample if the reconstruction error is below the component's threshold then its threshold is decreased, otherwise it is increased with, e.g., the 5 percent of the amount of decrease.

Another example uses a friend list of components for each component. The friend list of a component has a fixed length and contains the indices of other components as list elements. The list is ordered according to the values of the list elements. The values of the list elements are updated in the following way. When another component is active in a sparse code with the actual component being investigated, then the other component's value in the list is moved towards the reconstruction error of the sparse code. The list contains the smallest valued indices. A component is well tuned if its friend list contains enough number (e.g. k) of indices with enough low values (e.g. $0.001\|y\|_{L2}$).

Similarity measures can be, e.g., Euclidean distance, its exponentiated form, mutual information between the components, or a suitable approximation to it, or any temporal variant, e.g., time-delayed second order mutual information (S006) (FIG. 5). An example similarity measure is the magnitude of the pair-wise mutual information. This measure can be used both to determine the learning rate of components and to modify the preferences of components for sample generation. The magnitudes of the pair-wise mutual information (PMI) of a component with the other components are estimated differently with components in the same cluster and with components in different clusters. The PMI magnitude estimations of a component with each component in the same cluster are calculated and maintained. But PMI magnitude estimations of a component with components in different clusters are truncated so that only a given number (e.g. 0.01m) of the largest values are maintained to reduce memory requirements. PMI magnitude can be estimated, e.g., by summing up some nonlinear correlations of the components. Another similarity or dissimilarity measure is the pair-wise conditional probability of activation of components. The condition can be if one component is active, or if one component is active and the other component is selected from a given cluster. To store efficiently this measure it should be transformed into a sparse measure. An example transformation is the following.

The measure should be large when 2 components do not fire together (i.e. they probably belong to the same cluster) and small when 2 components fire together with the average expected rate. Also, this measure should be calculated only among components from different clusters. The learning of the similarity and dissimilarity measures can be speeded up by low-dimensional embedding methods.

After this the learning rate of each component can be determined (S007) (FIG. 5). The learning rate of the $i^{th}$ component determines the change rate of the $i^{th}$ column of Q and the $i^{th}$ row of W. The learning rate of a component is small if it is well tuned. The learning rate of a component is large if its average mutual information estimation within its cluster is smaller than the average mutual information of the components within its cluster.

After these measures are updated the matrices Q and W are tuned to decrease the reconstruction error, e.g., by gradient descent learning (S008) (FIG. 5): $Q(t+1)=Q(t)+(y-Q(t)s)(\alpha.*s)^T$, and $W(t+1)=W(t)+(\alpha.*(s-W(t)y))y^T$, or any stochastic variant of it. Another example for this tuning is to use a discretization learning algorithm, e.g., soft or hard winner take all algorithms, independent component analysis. After this the low usage rate components are tuned towards the elements with the highest usage rates (S009) (FIG. 5). With this tuning more components will be responsible for the reconstruction of frequently occurring input patterns, adaptively increasing the resolution of these patterns.

Another example for tuning is neighbor teaching based on the similarity and dissimilarity measures. The neighbors of an active component are tuned towards the active component ($Q_{.,j}=(1-cn_{ij})Q_{.,j}+cn_{ij}Q_{.,i}$, where i is an active component, and j is a neighbor of i by the measure $n_{ij}$, and c is a tuning rate parameter). A component is the neighbor of another component if they are similar according to the similarity and dissimilarity measures, e.g., their similarity measure is above a threshold. Here occurs the reordering of components among clusters. If there is a component which is not active with most of the components from another cluster then that component should be moved to the other cluster into the place of a not used component. The original place of the component can be randomly reinitialized and the measures of the new and original place of the component are reset to a default value.

Another example for tuning is to use the elite concept of CEM. The above introduced update rules are applied only if the current sparse representation and the current input are elite, that is the current sparse representation reconstructs the input well enough. In another way of using CEM an average value and a standard deviation is maintained for each matrix element. The current values of matrices Q and W for the current input are sampled from normal distributions with the maintained averages and standard deviations. Then the averages and standard deviations can be tuned according to the online CE method. If the current matrix values resulted in a sparse representation that reconstructs the input well enough then the average values are moved towards the current values of matrices Q and W and standard deviations are updated according to the standard deviations of the elite values.

Finally, the small magnitude values from Q and W matrices are removed so that each column of Q and row of W contain maximum a fixed number of nonzero elements and the columns of Q are normalized to prevent arbitrary large values within Q (S010), e.g., $Q_{.,i}=Q_{.,i}/\|Q_{.,i}\|_{L2}$, i=1 . . . m.

II. Another Method of the Present Invention

Figure 6:
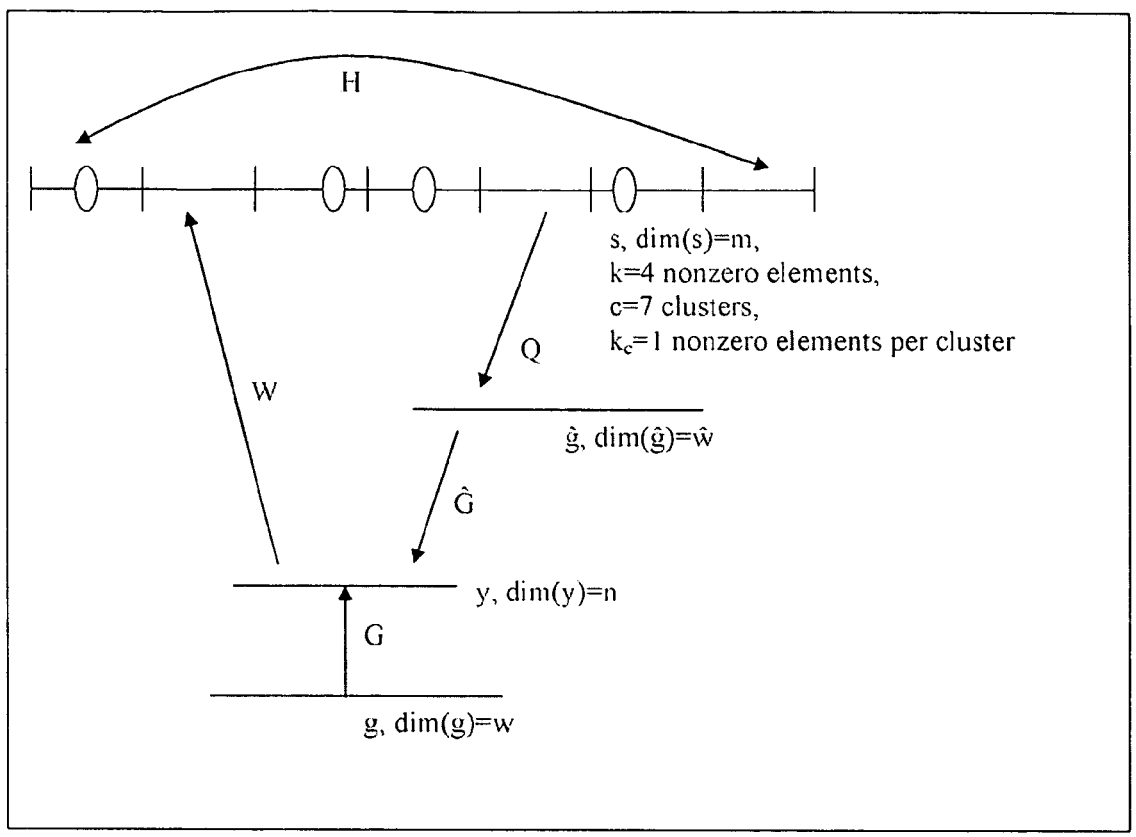
FIG. 6. is an overview of the architecture of a second method of the present invention.

FIG. 6 shows the overview of the architecture of this method. In this method signal g is measured by transformation G, so that the measured quantity is then y=G(g). Denote the dimension of the signal by w, w>=n that is the signal is potentially larger dimensional than the measurement.

The only difference in this case from the method of FIG. 1 is that Q maps from s to $\hat{g}$, and the estimated measurement is calculated as $\hat{y}=\hat{G}(\hat{g})=\hat{G}(Qs)$. The estimated signal dimension can be larger than the original signal dimension to achieve super-resolution, e.g., if G is a measurement matrix, $\hat{G}$ maps from larger signals than G does, and $\hat{G}$ contains interpolated values of G.

A hierarchical organization can be constructed from both of the methods. In a hierarchical organization the input of a next level is provided by a possibly nonlinear transformation of the sparse representations and reconstructed inputs of the previous levels. The input to the very first level is the input signal to be processed. The output of the system is the sparse representation and the reconstructed input at each level.

III. Summary of Method I and Method II

The above-described methods provide for parallel adaptive signal reconstruction from a multitude of measurements of a signal. These methods use a first sparse code which is generated from the received input signal. The first sparse code is nonlinearly sparsified to meet a sparsity constraint. Then the input signal is reconstructed from the sparse code producing a processed signal. The sparsity constraint is defined with the help of a sparsity measure that defines how sparse the sparse code is. The sparsity measure itself is based on a number of active components in the sparse code.

To generate the sparse representation and to reconstruct the input two transforms W and Q are used. A cost function is defined to measure the quality of the sparse representation, which cost function is based on a sparsity measure and a correlation quality of the reconstruction of the input signal. During calculation of the first sparse code some similarity and dissimilarity measures of the components of the sparse code are used. The W and Q transforms and the similarity and dissimilarity measures can be pre-wired or can be learned by the methods.

An individual learning rate is determined for each nonzero component of the sparse code. The learning rate of a component can depend on its usage rate and the similarity and dissimilarity measures with other components. The tuning of the transforms W and Q are to decrease the value of the cost function. Also there are tunings of transforms W and Q that make the low usage rate components of the sparse code more frequent. And, the values that are smaller than a threshold are removed from transforms W and Q and Q is normalized.

Furthermore, the selection based method described above is used to generate a first sparse code for an input signal with given transforms W and Q and similarity and dissimilarity measures of components in the following way. An initial preference of each component of the sparse code to become active is determined. Iteration begins. In one round of the iteration a population of phenotypes containing at least one phenotype is generated based on modified preferences. The modified preferences are calculated from the preferences of the components based on the similarity and dissimilarity measures. A phenotype is generated by selecting some active components based on their modified preferences and by calculating the continuous values of the active components to decrease the cost function. The cost function is evaluated for each phenotype and an elite set of phenotypes is determined containing the best few percent of phenotypes. The preferences of components of the sparse code are tuned based on the elite phenotypes. The iteration stops if the best value of the cost function is below a threshold and the corresponding phenotype satisfies the sparsity constraint or after reaching a maximal repetition number.

A hierarchical organization can be built from a multitude of the above methods. The input of a method in the hierarchy is a nonlinear function of the reconstructed inputs and sparse codes of the methods below the actual method in the hierarchy.

The initial preferences of the components of sparse code can be initialized from the received input by transform W.

Time dependent signals can be processed with the methods. One approach is to ignore time dependence. Another approach is to use concatenated input of single time signals. If the current signal and the previous t−1 signals are concatenated then the input of the method is t times larger than a single time signal. Yet another approach is to use concatenated input of different convolutions of single time signals. In this case if d different convolutions are used then the input of the method is d times larger than a single time signal. A convolution can contain arbitrary long time window of single time signals without increasing the size of the method input.

If time dependent input is processed then similarity and dissimilarity measures can include time dependency measures, or the parameters of predictive models on the sparse code. The models can be for example autoregressive integrating moving average models that can predict the preferences of the components of the sparse code of the current input from the previously calculated sparse codes of previous inputs.

The calculation of the modified preferences can be done e.g. by applying a diffusion model on the preferences with parameters depending on the similarity and dissimilarity measures of the components of the sparse code. This diffusion can be extended to time domain by predictive models. That is, the modified preferences can also depend on the previously calculated sparse codes of previous inputs.

The steps of the methods described in Section I, II and III, and as claimed herein, may be performed in different order while achieving the same or similar results. The present method invention is not limited to any one specific order of steps.

IV. Hardware of the Present Invention

A. Generally

In one embodiment, either method described above in Section I and Section II may be executed by a general purpose computer (GPC), or several GPCs, or a cluster of GPCs, or a grid of GPCs. The GPC may include graphics card processors, game console hardware (PS3, etc.), cell processors, personal computers, Apple computers, etc.

Figure 7:
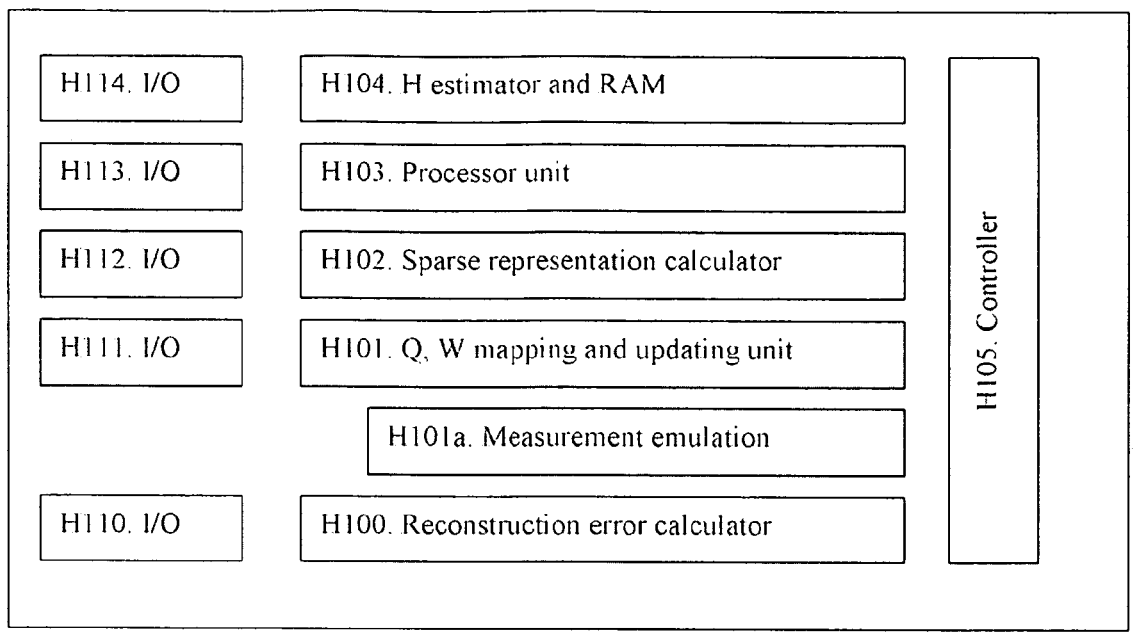
FIG. 7. is an overview of custom parallel hardware of the present invention.

In another embodiment, either method may be executed in special parallel hardware described below. FIG. 7 shows an overview of the components of the custom parallel hardware. There is a Processor unit with enough local RAM for the selection based algorithm to calculate sparse code, and the calculation of a (H103). There is a hardware unit with RAM for estimating and storing the inter-component similarity and dissimilarity measures (H104). There is a hardware unit to store and update the sparse representation during calculation (H102). There is a hardware unit to store matrices Q and W and to compute the mappings of Q and W and the update of Q and W with a given a (H101). For the method described in Section II above, there is a hardware unit that emulates the measurement, e.g. multiplies $\hat{g}$ by $\hat{G}$ and stores $\hat{G}$ (H101a). This unit can be omitted entirely if the measurement transformation is the identity transformation. There also is a reconstruction error calculation unit which calculates the reconstruction error (H100). These units are all made of simple components and are easily scalable for large dimensions. There are I/O channels for each hardware unit (H110-H114) and there is a controller unit that controls the units to execute a given function (H105).

The precision of the hardware units can be fitted to the actual signal processing problem, e.g., 32 bit floating point or 64 (8.56) bit fixed point.

Adders and multipliers work in the following way. If their output is 0, then they should not consume considerable power. If one of their inputs is 0 then they should not consume considerable power for calculation. This ensures low power consumption with sparse code calculations.

Figure 8:
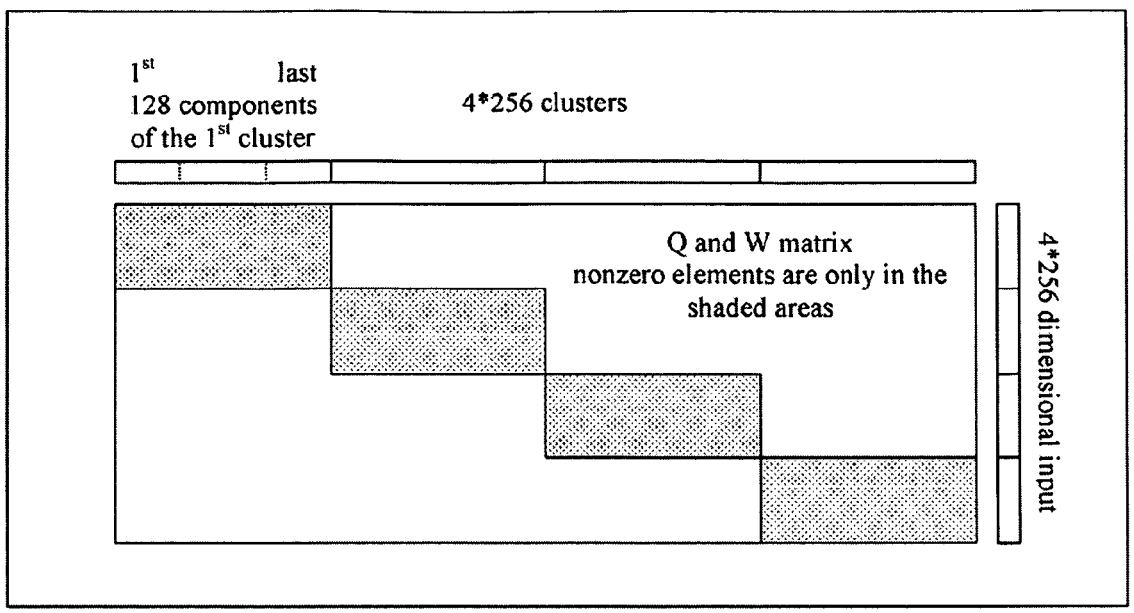
FIG. 8 illustrates the decomposition of the input into blocks to reduce hardware area and power consumption.

The input and sparse representation can be divided into blocks in order to reduce required hardware area and power consumption. For example, the input is 1024 dimensional and the sparse representation contains 1024 clusters with 128 components in each cluster (see FIG. 8). The input can be divided into 4 times 256 dimensional parts and the sparse representation can also be divided into 4 times 256 clusters. If the first 256 dimensions of the input can only be reconstructed by the first 256 clusters, then the 256*256 sized 4 blocks of input and clusters become independent from each other and only the inter-component similarity and dissimilarity measures connect them. This is enough to remove the artifacts of block arrangement from the reconstruction.

B. Hardware Components

1. Reconstruction Error Calculator Unit (H100)

This unit calculates the reconstruction error, and stores the reference input, and the reconstructed input.

The following interfaces are provided:
1. Reference input setting and querying;
2. Reconstruction error querying;
3. Reconstruction error size querying (in a predefined norm, e.g., L2);
4. Reconstructed input setting and querying; and
5. Working mode setting and querying (0: idle, 1: calculate reconstruction error and error size).

The following operations are provided:
1. The received reference input is stored until a new reference input is received;
2. The received reconstructed input is stored until a new reconstructed input is received; typically, more reconstructed input is received for a single reference input;
3. When a new reconstructed input is received and the working mode is set to 1, the reconstruction error is calculated as fast as possible (preferably during one clock cycle) and stored until a reconstructed input is received; and
4. When a new reconstruction error is calculated then the new reconstruction error size is updated, preferably during log n clock cycles, where n is the size of the input; after the calculation is finished working, the working mode is set to 0.

The following connections are provided:
1. The reference input is received from the host device;
2. The reconstructed input is received from unit (H101) and queried by the host device through the main I/O;
3. The reconstruction error and reference input are used by unit (H101) and can be queried through the main I/O;
4. The reconstruction error size is used by unit (H103) and can be queried through the main I/O; and
5. The working mode is queried and set by the Controller (H105).

One implementation is the following. The data is stored in 4*n+1 registers, in which 3*n registers are used for the reference input, reconstructed input and reconstruction error. Each register of the reconstruction error is connected to the output of an adder, that calculates the difference between the reference input and the reconstructed input, $e(i)=x(i)-y(i)$, where x is the reference input, y is the reconstructed input, e is the reconstruction error, and $z(i)$ denotes the $i^{th}$ component of the vector. The reconstruction error size is stored in the plus 1 register. To calculate L2 norm a multiplier is used for each component of the reconstruction error that calculates the square of that component and writes the result to n registers. Then, an adder tree adds up the squares of the registers. The total number of required adders is 2*n (error calculation and error size summation). The total number of required multipliers is n (square calculation). Plus, one register for the working mode and control logic are used to control the working of this block.

2. Sparse Code Calculator Unit (H102)

The sparse code calculator (H102) stores an actual sparse code and updates it depending on the working mode. During sparse code calculation, the received update vector multiplied by update rate is added to the actual sparse code and the new vector replaces the actual sparse code. During W tuning the sparse code error is calculated; that is, the received initial guess of the sparse code is subtracted from the calculated sparse code and the error vector is stored for further calculations.

The following interfaces are provided:
1. working mode setting and querying (0: idle, 1: sparse code calculation, 2: W tuning);
2. actual sparse code setting and querying;
3. update vector or initial guess setting; and
4. update size setting and querying.

The following operations are provided:
1. common:
   a. The actual sparse code is stored until an update is received or a new actual sparse code is received; and
   b. The working mode is set to 0 after an operation is finished.
2. working mode 1 (sparse code calculation):
   a. When an update vector is received and working mode is set to 1, the update vector is multiplied by the update size and added to the actual sparse code; the resulting vector replaces the actual sparse code.
3. working mode 2 (W tuning):
   a. When an initial guess sparse code vector is received and the working mode is set to 2 the guess is subtracted from the stored actual sparse code and both the result and the actual sparse code are stored.

The following connections are provided:
1. The update size is set and queried by the Processor unit (H103) and through the main I/O;
2. The actual sparse code is set and queried by the Processor (H103) and (H101) units and through the main I/O;
3. The update size and initial guess of sparse code are received from unit (H101);
4. The sparse code error is used by unit (H101); and
5. The working mode is set and queried by the Controller (H105).

One implementation is the following. The data is stored in 3*m+1 registers. The actual sparse code is stored in m registers. The update rate is stored in the plus 1 register. In working mode 1 the received update vector is stored in m registers and a multiply-and-adder for each component adds the update vector multiplied by the update rate to the stored sparse code and writes the result to a third set of m registers; after this the result is copied to the first set of m registers to store the updated sparse code. When actual sparse code is queried the values of the first set of m registers are returned. In working mode 2 the received initial guess is stored in the second set of m registers and the multiply-and-adders for each component now subtracts this initial guess from the actual sparse code and writes the result to the third set of m registers. When the sparse code error is queried then the stored values of the third m registers are returned. Plus, one register for the working mode and control logic are used to control the working of this unit.

3. Q, W Mapping and Updating Unit for Matrices (H101)

This unit (H101) multiplies the sparse code with Q, multiplies the reconstruction error with W providing a sparse code update, updates Q with the multiplication of the reconstruction error and the sparse code, and updates W with the multiplication of the sparse code error and the reference input.

The following interfaces are provided:
1. working mode setting and querying (0: idle, 1: sparse code update calculation, 2: Q update, 3: W update);
2. setting and querying of learning rates of components for Q and W tuning separately;
3. setting and querying of small value threshold; and
4. setting and querying of Q and W matrices.

The following operations are provided:
1. common:
   a. matrices are stored; and
   b. working mode is set to 0 after an operation is finished.
2. working mode 1:
   a. load matrix values to multipliers;
   b. calculate reconstructed input from actual sparse code (with 100 MHz at least); calculation done only on active components; and
   c. calculate sparse code update from reconstruction error (with 100 MHz at least); calculation done only on active components.
3. working mode 2:
   a. update Q matrix with the actual sparse code, reconstruction error and learning rates of components; update is done only on active components;
   b. tune selected components towards a marked component with set learning rates for selected components; selection means that the actual sparse code is 1 at the selected components, whereas marking means that the actual sparse code is 2 at the marked component;
   c. randomize selected components; selection means that the actual sparse code is 1 at the selected components;
   d. remove small values from selected columns of Q; and
   e. normalize selected columns of Q to have unit length in some norm, e.g., L1 or L2.
4. working mode 3:
   a. calculate initial guess sparse code from reference input; calculation done only on active components;
   b. update W matrix with the sparse code error, reference input and learning rates of components; calculation done only on active components;
   c. tune selected components towards a marked component with set learning rates for selected components; selection means that the actual sparse code is 1 at the selected components, whereas marking means that the actual sparse code is 2 at the marked component;
   d. randomize selected components; selection means that the actual sparse code is 1 at the selected components; and
   e. remove small values from selected rows of W.

The following connections are provided:
1. sparse code and sparse code error is received from unit (H102);
2. sparse code update and initial sparse code guess is provided to unit (H102);
3. reconstructed input is provided to unit (H100);
4. reconstruction error is received from unit (H100);
5. Q and W matrices can be set and queried by the main I/O;
6. learning rates, and threshold for small value removal can be set and queried by unit (H103) and main I/O; and
7. working mode is set and queried by controller (H105).

One implementation is the following. There is a separate part of a chip for operations on and storage of Q and W. The storage and operations are separated but are on the same chip. First the Q part is detailed. The Q matrix is stored in an on-chip RAM with memory controller which makes the matrix addressable by columns so that a whole column can be read from it or written into it. The operations area contains a full matrix multiplier with some additional components. The full matrix multiplier is composed of multipliers with 2 input registers and 1 output register for each and the multipliers are arranged in a matrix form (see FIG. 9). The number of columns determines the maximal number of active components the system can handle. It is preferable to have more columns than k, but no more than the number of clusters if the sparse representation is clustered. For each row of the multipliers there is a full adder tree (see FIGS. 9 and 10) that calculates the sum of that row in log n steps, and the result is written to an output register for each row.

Figure 9:
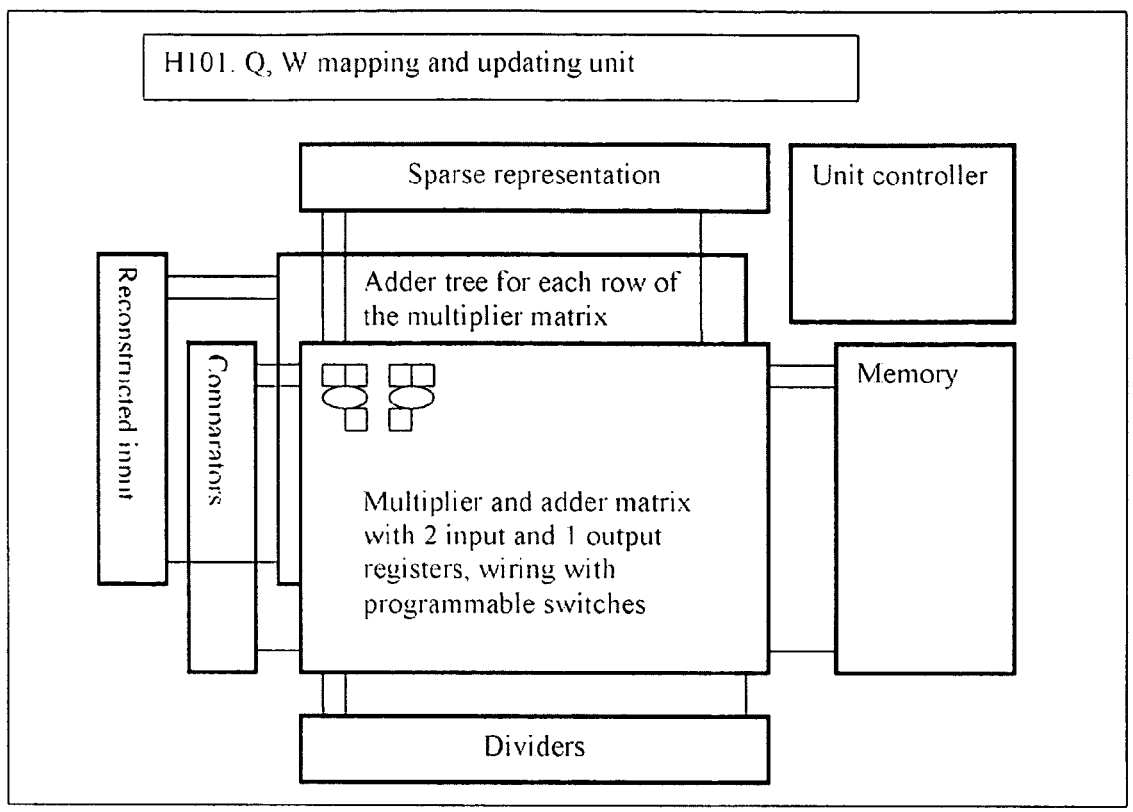
FIG. 9 illustrates hardware details of the custom parallel hardware of FIG. 7.

More specifically, the input registers of the multipliers of FIG. 9 can be loaded with the columns of Q, with the actual sparse code (one column will have the same value of the corresponding component in the sparse code), with the reconstruction error (one row will have the same value of the corresponding component in the reconstruction error), and the value of the result register can be copied back. There is a matrix of adders, with each adder having 2 input registers and 1 output register placed next to a corresponding multiplier as conceptually illustrated in FIG. 8. The result register of the multiplier can be copied to the input registers of the adder, and the result register of the adder can be copied to the input registers of the multiplier. The result registers of one column of adders can be copied to the input registers of a column of comparators, and the other input registers of the comparator can be loaded with a threshold. The result registers of the comparator can be written to the input registers of one column of multipliers or adders. The input registers of one adder in each column of adders can be loaded with the result registers of all other multipliers or adders in that column. The result register of these adders in each column can be loaded to the input registers of a divider for each column. The result register of the divider can be loaded to the input registers of the multipliers or adders of the corresponding column.

There is a controller and a register for the working mode. The controller controls the units to execute the required operation and then sets the working mode to 0. The program of working mode 1,a,b is straightforward, there are multiple executions of this program with the same active components, but before the first iteration the columns of the active components are loaded to the first input registers of the multipliers (working mode 1a) and the working mode is set to 0. Whenever the working mode is set 1,b the actual sparse code is copied to the second input registers of the multipliers and the results of each row are summed by the adder tree and after the sum is ready the working mode is set to 0.

The program of working mode 2ade, described above, is the following. The matrix values should be in the first input registers of multipliers; if not they are loaded pursuant to working mode 1a. These matrix values are copied to the first input registers of the adders. The learning rate for each active component and the actual sparse code is loaded to the input registers of the multipliers and the result of the multiplication is copied back to the second input registers of the multipliers. The reconstruction error is loaded to first input registers of the multipliers and the result is loaded to the second input registers of the adders. The result of the adders is copied to the free input registers of the comparators, and the other input register of the comparators is loaded with the threshold when the threshold is set. The comparator result is loaded to both input registers of the multipliers to calculate L2 norms. The result of the multiplication is sequentially copied to the one adder to sum up each of the values in each column. The result is a denominator of the divider and the numerator is 1. The result of the division is loaded to the second input register of the multiplier and the result of the multiplication is written to RAM. After all columns are written, the working mode is set to 0.

The program of the working mode 2bde, described above, is the following. The selected components are loaded to the input registers of the multipliers, one minus learning rate of each component is loaded to the second input of the multipliers and the result is written to the first input of the adders. Then the marked component is loaded to all multipliers, learning rate is loaded to the second input of multipliers and the result is written to the second input of adders. The result of the adders is processed in the same way as in the 2*ade* program, when they are copied to the comparators. For program 2*cde* random number generators are required or the program can be run after some iterations of program 1*b* and the result of multipliers can be written back to the columns of selected components. The W matrix part and corresponding working modes have a similar structure.

Figure 10:
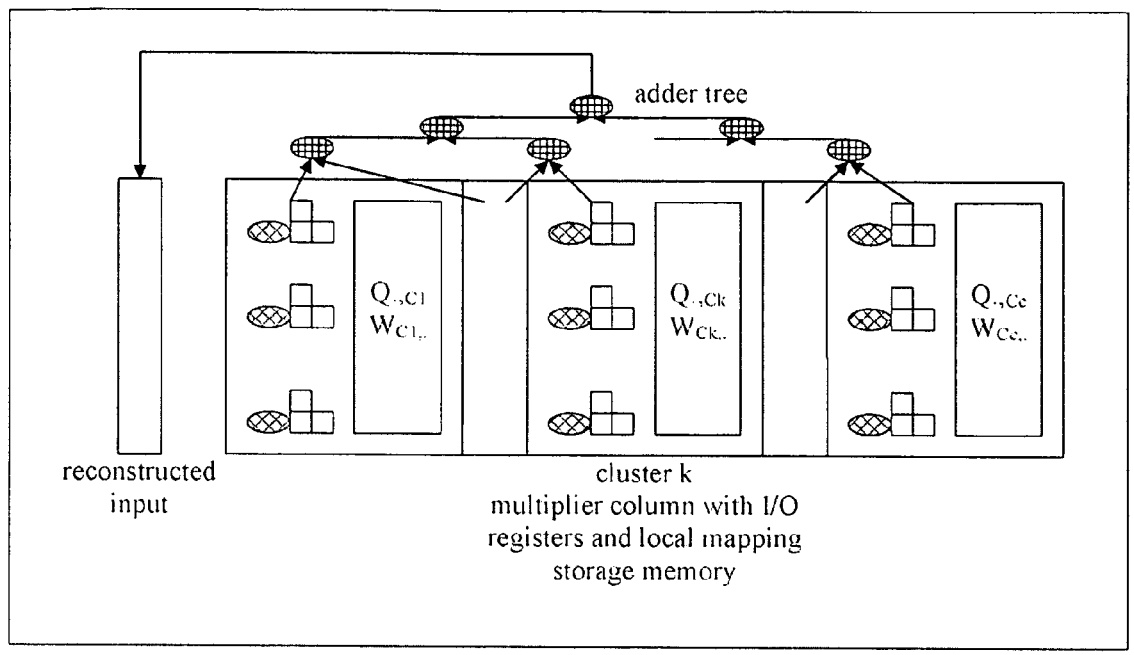
FIG. 10 illustrates hardware details of the custom parallel hardware of FIG. 7 when the sparse representation is clustered and the values of Q, W mappings are stored locally at each cluster.

In the case of clusters, the memory transfers may be made faster. There are $k_c$ columns of multipliers for each cluster and the columns of Q are stored next to the multipliers in registers. A multiplier in a given row and cluster will only read and will only write the Q values corresponding to that row and cluster. FIG. 10 illustrates the case when $k_c$ is 1. Note that only the multipliers and adder tree are in the figure, the other units required for tuning are omitted from this figure.

4. Processor Unit (H103)

The Processor unit (H103) of FIG. 7 runs the selection algorithm and adaptation, and controls the other components through the Controller (H105).

The following interface is provided:
1. setting and querying of the maintained measures of components, e.g. usage rate, learning rate;
2. algorithm parameter setting and querying; and
3. working mode setting and querying (0: idle, 1: process new input with adaptation, 2: process new input without adaptation).

The following operations are provided:
1. working mode 1:
   a. process new input with adaptation.
2. working mode 2:
   a. process new input without adaptation.

The following connections are provided:
1. The reconstruction error size is received from unit (H100);
2. The sparse code guess and calculated sparse code is received from unit (H102);
3. The learning rate's and active components are set in unit (H102);
4. The control information is sent to Controller (H105);
5. The control information is received from Controller (H105), preferably in the form of interrupts to avoid empty loops;
6. The unit (H104) is used for measure maintenance; and
7. The algorithm parameters and working mode are set and queried by main I/O.

One implementation is that there is a processor for each cluster with a random number generator and enough RAM to store the measures of components of the cluster. The two extreme implementations are when there is a separate processor for each component and the other is when there is only one processor. The first case might use too much power while the latter case might be too slow compared to the other units of the system shown in FIG. 7.

5. Inter-Component Measures Estimator and RAM (H104)

This unit (H104) helps in the calculation and storage of measures among components, e.g., mutual information estimation, and pair-wise conditional probability of activation of components.

This unit (H104) contains multipliers and adders with separate input and output registers with programmable connections corresponding to at least the number of components within each cluster. Also, this unit (H104) has enough RAM to store measures precisely within a cluster and the large values of measures with components from other clusters.

6. Controller (H105)

This unit (H105) contains medium level programs to control other units, e.g. the sparse code calculation involves the cooperation of 3 units, and these are to be synchronized. This unit (H105) notifies the processors when the required operation is finished. The unit (H105) also has access to the working mode interface of other units and the interface of processors to signal the end of operations. It can be implemented by a small microcontroller.

7. I/O Interfaces (H110-H114)

FIG. 7 also illustrates the hardware input/output (I/O) interfaces. The primary input is the measurement values (H110). These values are scaled to be properly represented by the hardware. Additionally the matrices can be initialized through memory write operations (H111-114) accessing W by its rows and Q by its columns.

The primary outputs are the sparse signal (H113) and the reconstructed $\hat{g}$ signal (H111) if available. Additionally the learned matrices can be retrieved from the hardware by memory read operations (H114, H112) and the reconstructed measurement can be obtained (H110).

In another embodiment, hybrid hardware may be used that is composed of a general purpose computer and the units (H100), (H101), (H101*a*) if the method in Section II is used, and (H102) of the above hardware. This hybrid solution offloads the computationally most expensive parts of the algorithms into the special hardware while the algorithmically complex part remains on the general purpose computer which can be programmed more freely than the above hardware. This allows the use of this hybrid solution in a wider range of algorithms. In this hybrid solution, the primary input includes calculation mode control information from the PC and sparse code setting.

C. Example Mapping from Pseudo Codes to Hardware

Most lines of the example pseudo codes would be executed in the processor unit (H103). The other units are used during sparse code calculation and tuning of Q, W mappings, see FIG. 11 and FIG. 12.

Figure 11:
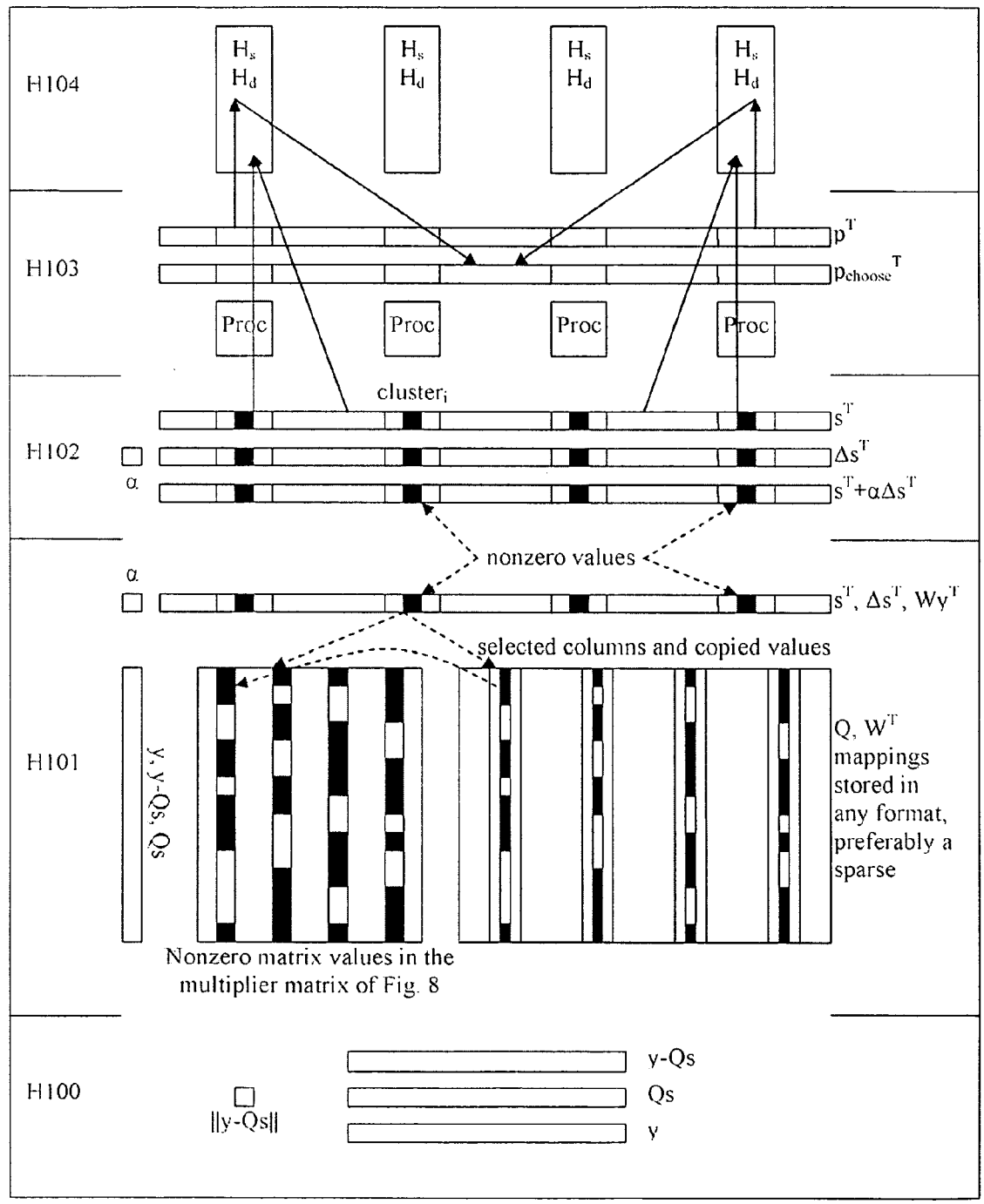
FIG. 11 is a logical system overview showing hardware storage areas of various variables of the pseudo codes.

During sparse code calculation the preferences of components are modified by similarity and dissimilarity measures. This modification is helped by (H104), e.g. multiplications and nonlinear transformations are executed in this unit and not in the processor unit. In FIG. 11, the H104 unit for each cluster calculates the modification of the preferences based on the preferences in the cluster. The update of similarity and dissimilarity measures are also aided by (H104) in a similar way. In FIG. 11, the H104 unit for each cluster calculates nonlinear transformations and multiplications of values of sparse representation components from other clusters and values of sparse representation components from the cluster of the unit.

During the calculation of the continuous values of the active components of a phenotype the following hardware units are used: (H100), (H101), (H101*a*) if the second method is used with signal measurement simulation (not shown in FIG. 11 and FIG. 12), (H102), and (H105) to control the working of the previous units. Once the processor unit (H103) selected the active components of a phenotype (H102 black marks in s) and the continuous values of the active components are initialized by the H101 unit, 1a3a program of (H101) (in FIG. 11 load matrix values of W and calculate initial values of active components: Wy), an iterative calculation begins that decreases the L2 norm of the reconstruction error y−Qs. This is the following program H101,1*b*; H100; H101,1*a*; H102,1; H101,1*b*;. This iteration goes on until an iteration number limit is reached or the reconstruction error goes below a limit. In FIG. 11 during iteration the actual sparse representation is downloaded from the H102 s unit to the H101 s unit. Then the reconstructed input, Qs is calculated and copied from the H101 Qs unit to the H100 Qs unit. Note that the adder trees required for matrix multiplication are not shown in FIG. 11. In H100 the reconstruction error, y−Qs and its size ∥y−Qs∥ are calculated. Then the reconstruction error is copied from the H100 y−Qs unit to the H101 y−Qs unit and W(y−Qs) is calculated and written into the H101 Δs unit. This is copied to the H102 Δs unit and s+αΔs is calculated and copied back to the H102 s unit. From here starts the next iteration. Although the number of multipliers is maximally n*n usually much less multipliers are used because of the limited number of nonzero values in the sparse representation. If there are clusters then only $k_c$ columns of multipliers are enough per cluster, which allows a modular combination of processing units and memory units as described above (see FIG. 10). Also, there are possibly many zero values in each column of Q, which reduces power consumption. The sparse mappings, clustered sparse representation, and the adaptive capabilities of the algorithms enable hardware failure tolerance by assigning zero values to places in the mappings that would be processed by failed hardware components (to not use those) and adapting the other values of mappings to these constraints.

During tuning of Q mapping the H101,2abcde program is executed on (H101). The sparse code calculation unit (H102) transfers the learning rates, and selected and marked components which are set by the processor unit (H103) before each subprogram starts. During this program the reconstruction error is copied from the H100 y−Qs unit to the H101 y−Qs unit and s is copied from the H102 s unit to the H101 s unit. Then (y−Qs)*(α.*$S^T$) is calculated for the nonzero components of s and added to the corresponding columns of Q. Then these columns are further modified in FIG. 11 (divider, adder and comparator units are not shown); see FIG. 9 for further details.

During tuning of W mapping the following program is executed: H101,3a; H102,2; H101,3bcde. This program calculates the calculated sparse code difference with the initial sparse code guess and executes all updates of the W matrix. During this program the input is copied from the H100 y unit to the H101 y unit, and Wy is calculated for the active components of the sparse representation and copied from H101 s to H102 Δs. Then s−Wy is calculated in H102 and copied from the H102 s+αΔs unit to the H101 Δs unit. Then (α.*Δs)*($y^T$) is calculated for the nonzero components of s and added to the corresponding columns of $W^T$. Then these columns are further modified in FIG. 11 (divider, adder and comparator units are not shown), see FIG. 9 for further details.

Figure 12:
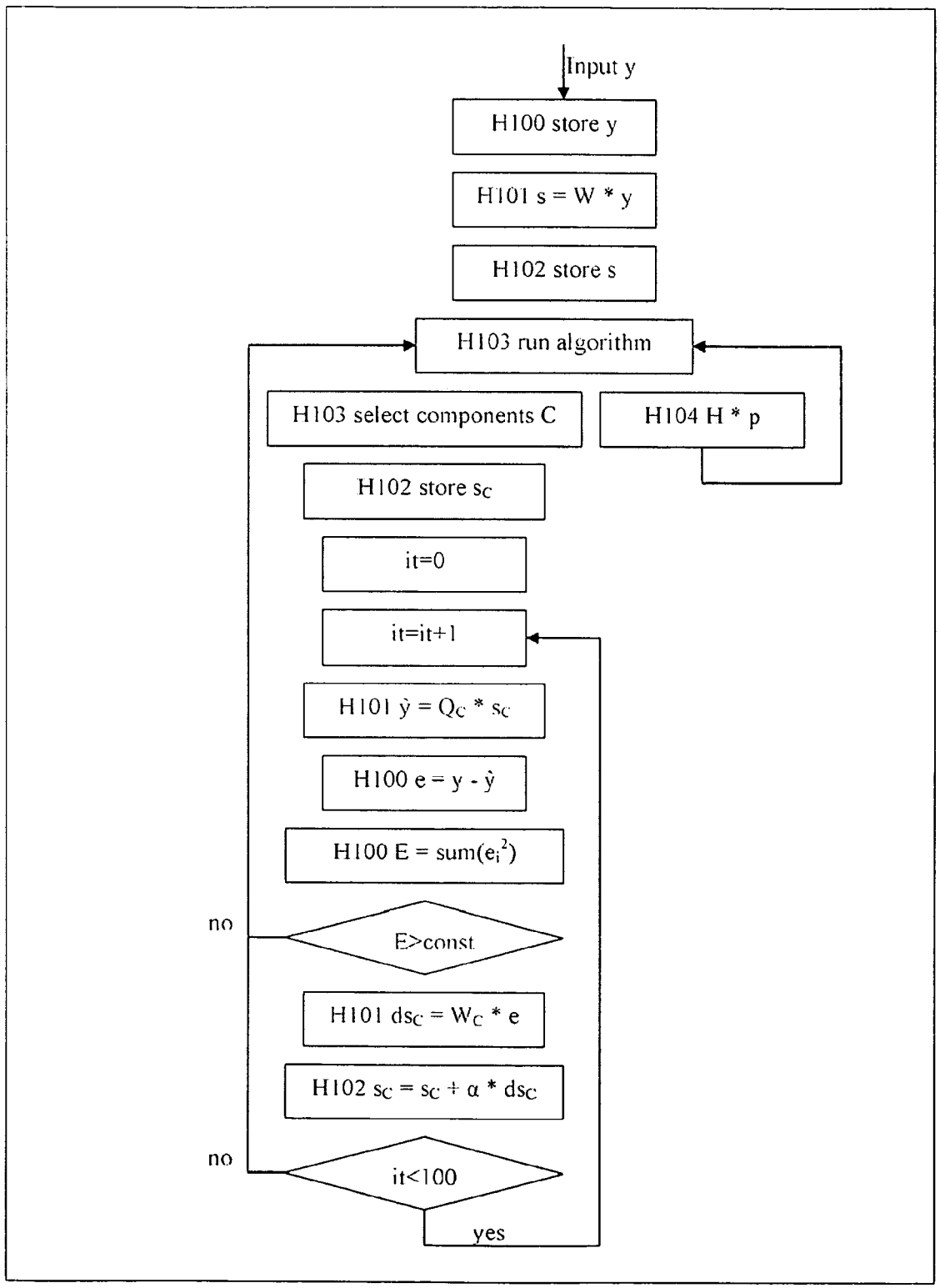
FIG. 12 is a dataflow diagram showing an example of how a single input signal is processed by hardware components.

In general the methods can be executed by the hardware in the following way, as shown in FIG. 12. An input signal is received and stored by H100, (S001, FIG. 2). Then sparse code calculation begins (S002, FIG. 2). First an initial value is calculated for each component. This is done by processor unit H103 setting active one component in each cluster and calculating the initial values of these by H101 3a program and then setting other components as active by processor unit H103 until all components have an initial guess (S202, FIG. 3). Then the processor unit H103 creates the initial preferences of all components (S202, FIG. 3). During phenotype generation H104 helps the processor unit H103 to modify the preferences of components by executing, e.g., multiplications, nonlinear transformations (S204, FIG. 3). For each phenotype the processor unit H103 selects some active components based on the modified preferences (S205, FIG. 3) (C, FIG. 12). Once the active components are selected their initial values are set in S102 and continuous value calculation of these components is executed by H100-H102 as described above. The processor unit H103 retrieves the reconstruction error size from H100 and calculates the cost of each phenotype determines the elite set and updates the preferences. Once a sparse code is calculated it is truncated by processor unit H103 (S003, FIG. 2). The statistics and learning rates of the components are updated by processor unit H103 (S004-S007, FIG. 2). During the update of the similarity and dissimilarity measures H104 helps by executing, e.g. multiplications and nonlinear transformations. The transformation updates (S008-S010, FIG. 2) are executed by H100-H102 units controlled by the processor unit H103 and controller H105 as described above.

V. Summary of the Hardware of the Present Invention

The computer architecture described in Section IV above for implementing the methods of the invention has the following main units. An input receiving and reconstruction error unit (H100) receives and stores the input and the reconstructed input, and it calculates the difference of the received input and the reconstructed input. A high-speed matrix-vector multiplication unit (H101) calculates and updates the transforms W and Q. A sparse code updating unit (H102) stores and updates the first sparse code. A processor unit (H103) containing at least one processor executes those parts of the methods that are not executed by other units. The input receiving and reconstruction error unit, the high speed matrix multiplication unit, and the sparse code updating unit forms a closed loop to calculate the continuous values of the active components of the first sparse code. This architecture can be extended with a unit (H104) calculating the modified preferences from the preferences of the components of the sparse code and updating similarity and dissimilarity measures of components.

The computer architecture also benefits from a clustered sparse code where within each cluster of components only a limited number of components can be active at a time. In this case the high speed matrix-vector multiplier unit (H102) can be divided into parts corresponding to clusters. Each part is responsible for calculating and storing the parts of transforms W and Q corresponding to the components of the cluster the part is responsible for. In this case a processing part of the processor unit (H103) can be assigned to a cluster, with each cluster having a separate processing part.

VI. Applications Generally

Figure 13:
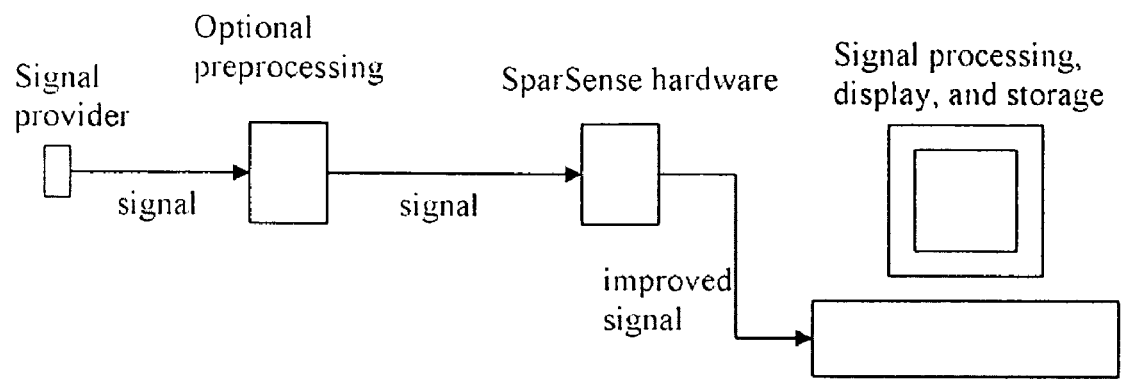
FIG. 13 is a system diagram used to describe sparse signal processing in accordance with the present invention for various applications.
Figure 14:
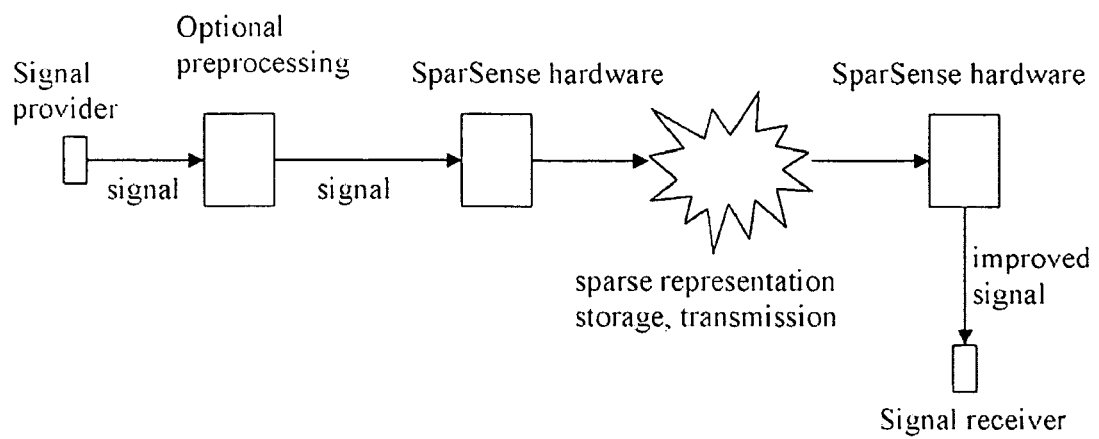
FIG. 14 is a system diagram used to explain signal compression and decompression in accordance with the present invention.
Figure 15:
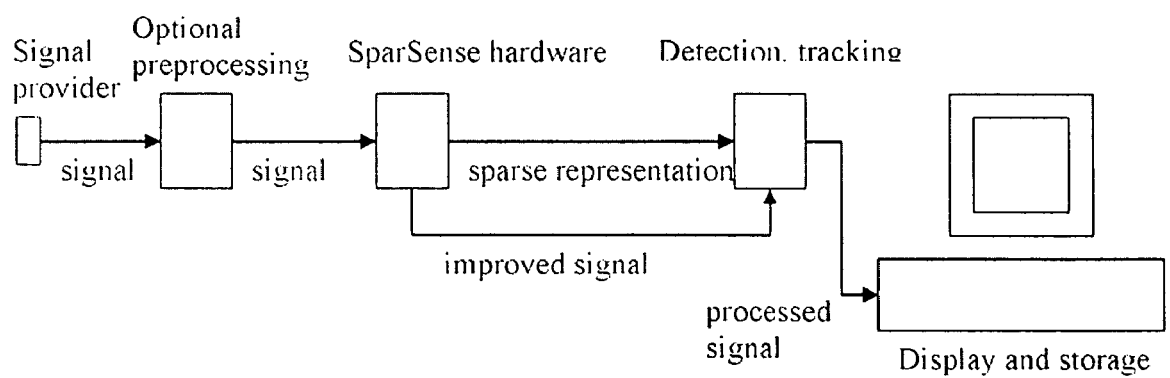
FIG. 15 is a system diagram used to provide component detection and tracking of a signal.

FIGS. 13-15 are used to describe, broadly, application areas of the present invention.

Additional signal pre-processing before the signal is processed by these algorithms can be applied. Signal pre-processing favouring sparse representation, e.g., independent component analysis, can improve the performance of these algorithms.

In general for the processing of time series of signals (e.g. video) there are more ways. The simplest way is to ignore the possible dependencies of signals coming after each other (e.g. process the frames of a video one-by-one). Also, there are more ways which can be combined to take into account the time dependency of the signal. One way is to use concatenated signal as input for the processing. The signals within a time window are concatenated to form a single input (e.g. multiple frames forms a single input). Then the Q and W mappings will map time series of the signal thus the components of the sparse representation will represent time series of the signal. Another way to use time dependency of input signals is to use convolved input next to the one time input. This does not increase the input dimension of the algorithm as the time depth is increased. A dynamical model can be learned on the sparse representation and the sparse representation of the next signal can be predicted from the already calculated sparse representations. Here small dimensional embedding helps the learning of the dynamical model as in the case of similarity and dissimilarity measures. The dynamical model can be hardwired, also.

A. Signal Preprocessing (FIG. 13)

For general purpose signal preprocessing the algorithms can be used to filter out noise from a signal, and for pattern completion to decrease the required measurement time for a given signal quality, or to improve signal quality, e.g. resolution, sharpness, signal-to-noise ratio. The columns of matrix Q form the basic patterns from which the signal is reconstructed. Some values might be missing from the signal or corrupted (e.g. missing or noisy pixels in an image). The patterns in matrices Q and W that are selected are based on the available values in the signal that can reconstruct the missing or corrupted values.

In this general case with reference to FIG. 13, the algorithm receives the signal from a signal provider device (e.g. CCD camera, spectrometer, MRI coils), removes noise from signal and restores the required quality signal. The preprocessed, improved signal is transmitted to the signal processor, display, storage, etc device that corresponds to the actual use of the signal and application. This includes, e.g., the case when the signal is an image provided by a video-card to be displayed on a monitor and the algorithm improves the image between the video card and the monitor.

Signal super-resolution can be achieved with both the first and the second method of the invention, that is the reconstructed signal will be higher dimensional (e.g. more pixels in an image) than the original signal. With the second method this can be achieved by using an interpolated $\hat{G}$ matrix that maps to larger signals (e.g. images) than the original G matrix. With the first method this can be achieved by interpolating the columns of Q matrix.

Specific applications (described more fully below in Section VII): A: MRI; B: Thermal Scanner; C: Spectrometer; D: Internet TV; F: Telesurgery; G: Product Testing.

B. Signal Compression (FIG. 14)

With reference to FIG. 14, for signal compression and decompression it is required to store matrices Q and W with which the signal was compressed in order to retrieve the signal. The compression is almost lossless; the unstructured noise is filtered out from the signal during compression. The compressed signal is the sparse representation of the signal, which is to be stored or transmitted. The sparse representation achieves compression by coding only the nonzero components' indices and values plus error correction if required. The amount of compression is application dependent. In some cases compression to 1% can be achieved.

In a typical scenario the received signal is compressed somewhere and at another time and possibly at another place it is restored by the algorithms using the same matrices as used for the compression.

Specific applications (described more fully below in Section VII): A: MRI; B: Thermal Scanner; C: Spectrometer; D: Internet TV; E: Multiplayer Online Games; F: Telesurgery.

C. Signal Component Regression, Detection, and Tracking (FIG. 15)

With reference to FIG. 15, the calculated sparse representation can be used to improve component detection and tracking in the signal (e.g. object recognition, face recognition, face tracking). Also, the sparse representation can be used to improve regressions of signal components. The otherwise used detector and tracker methods can be used on the sparse representation. Also, other methods can be used.

Specific applications (described more fully below in Section VII): A: MRI; B: Thermal Scanner; C: Spectrometer; D: Internet TV; F: Telesurgery; H: OCR; I: Speech Recognition; J: EEG BCI; K: Multi-Electrode Implant.

VII. Specific Applications of the Present Invention

A. MRI

All of the applications described in this Section VII(A) are valid for 1, 2, and 3 dimensional MR imaging and MR video.

A first application is a signal preprocessing application to decrease MRI measurement times, and to reach MR video speed. The signal providers are the Radio Frequency coils of the MRI device. In the case of the first method of Section I described above, the signal processor includes a Fast Fourier Transform (FFT) device. In the case of the second method of Section II described above, the FFT is implicitly executed by the algorithm, so further signal processing does not include an FFT. The algorithm filters out unstructured noise from the signals of the RF coils. Also, the algorithm completes the partial measurements to contain all values for further processing. The noise filtering enables a shortened delay between sequential measurement parts. The shorter the time intervals are left, the more noise in the measured signals are, thus improved noise filtering enables shorter time intervals. In conventional MRI as many values have to be measured as there are pixels in the MR image. An MR image, as all natural images, contains many redundant pixel values. Typically, the images can be compressed to 10% of the original size, without information loss. Carefully designed measurement sequences measure less values and the algorithm with its pattern completion capability fills in redundant values. A measurement sequence determines the order of the measurements of the required values to calculate the MR image. Measurement sequences are, e.g., lines in random directions, spiral, circles. (Application area Section VI(A)-FIG. 13.)

Another application is a signal preprocessing application to further improve the processed MR image before display and storage. The signal provider is the MR signal processor that provides the MR images. An MR image might contain many types of noises. Some of these are unstructured and automatically filtered out by the algorithm. Others have very specific structures. These structures can be found in the sparse representation of the image and can be removed by deactivating those components of the sparse representation that reconstruct the noise. (Application area Section VI(A)-FIG. 13.)

A third application is a signal compression application to store and transmit MR images and videos. The sparse representation of the raw MR data or the sparse representation of the processed MR images can be stored or transmitted. (Application area Section VI(B)-FIG. 14.)

A fourth application is a component detection application. It uses the sparse representation of the processed MR image or of the raw MR data to help the diagnosis by marking the probably interesting places of the image. If there are special features of interesting deviations of MR image parts, e.g. marks of diseases, then these image features can be built into the sparse representation. Alternatively, the algorithm learns these features during signal processing. On the sparse representation a classifier or other detectors can be trained efficiently (with hand marked images) to recognize the desired image parts. (Application area Section VI(C)-FIG. 15.)

A fifth application is a component tracking application to track the body organs on MR video. Most of the imaged body parts move during examination. If distinct body parts are recognized and tracked then it can improve video quality and help the diagnosis. A tracking algorithm can be trained on the sparse representation of MR raw data or MR image data, similarly to the component detector. (Application area Section VI(C)-FIG. 15.)

B. Thermal Scanner

One application of the present invention is a signal preprocessing application to improve the received thermal image before display and storage and reduce the required number of pixels and measurement time to reach a given image quality. The signal providers are the thermometers in the scanner. Noise filtering enables smaller thermometers with shorter individual measurement times to fit the scanner for medical applications and provide images with video speed. Pattern completion enables to use fewer sensors then the number of pixels in individual images, which further reduces the size of the scanner. (Application area Section VI(A)-FIG. 13.)

A second application is a signal compression application to store and transmit thermal images and videos. The sparse representation of the thermal images can be stored or transmitted. (Application area Section VI(B)-FIG. 14.)

A third application is a component detection application. It uses the sparse representation of the thermal image e.g., to help the diagnosis by marking the probably interesting places of the image. If there are special features or interesting deviations of thermal image parts, e.g. marks of diseases, then these image features can be built into the sparse representation. Alternatively, the algorithm learns these features during signal processing. On the sparse representation a classifier or other detectors can be trained (with hand marked images) efficiently to recognize the desired image parts. (Application area Section VI(C)-FIG. 15.)

A fourth application is a component tracking application to track the objects on thermal video. It can be used, e.g., to track body parts while the scanner is moving inside a patient. Also, it can be used to track people or animals in darkness. A tracking algorithm can be trained on the sparse representation of image data, similarly to the component detector. (Application area Section VI(C)-FIG. 15.)

C. Chemical Component Detection in Gasses, Spectroscopy

One application is a signal preprocessing application to improve the signal-to-noise ratio and to decrease the required number of spectrogram samples to reach a given accuracy in component recognition or regression or in any other application. (Application area Section VI(A)-FIG. 13.)

A second application is a signal compression application to store or transmit the spectrograms. The sparse representation of the spectrograms can be stored or transmitted. (Application area Section VI(B)-FIG. 14.)

A third application is a component detection or regression application to detect a component in gasses or to measure the amount of a gas component in a gas complex from the spectrogram of the gas. The signal provider is the spectrogram; signal processing includes the gas component detection or regression methods. The sparse representation can contain (built in, or learned) specific features of the spectrograms. These features correspond to structured noise sources that can be eliminated by deactivating the components of these features. Also, features corresponding to gas components make easier the detection or to precisely determine the amount of components in the gas. (Application area Section VI(C)-FIG. 15.)

D. Internet TV

One application is a signal preprocessing application to improve video quality before it is displayed in the user's monitor. The signal provider is the video-card in the user's computer, and the improved signal after the algorithm improved it is displayed in the monitor. (Application area Section VI(A)-FIG. 13.)

A second application is a signal compression application to transmit the video to the user. This requires the execution of the algorithm at the video transmitter and at the users' side. At the signal provider side the video is compressed before it is sent over the internet by the algorithm with given matrices Q and W. At the user's side the video is decompressed after reception by the algorithm with the same matrices Q and W. Then, the video is either sent for further processing or to the monitor. The decompression requires much less computational power than compression, as the former requires only one moderate sized matrix multiplication per video frame. (Application area Section VI(B)-FIG. 14.)

A third application is a component tracking application to increase the visibility of small fast moving objects, e.g. the ball in soccer or ice hockey broadcasting. This application can be either at the user's side or at the provider's side. The former allows the user to choose the object to be tracked on the video. For tracking the sparse representation is readily available if the video is sent in compressed form, i.e. the sparse representation is sent by the provider. On the sparse representation a tracker algorithm can be applied that requires an initial input to determine the object to be tracked. (Application area Section VI(C)-FIG. 15.)

E. Multi Player Online Games

One application is a signal compression algorithm to decrease the latency of multi player games by compressing the data to be sent to other players and by filtering out noise from the received data. (Application area Section VI(B)-FIG. 14.)

F. Telesurgery

These applications are basically the same as the internet TV applications described above in Section VII(D). The difference is in the quality of the service. Telesurgery requires better quality and more reliable devices than internet TV.

One application is a signal preprocessing application to improve video quality before it is displayed in the doctor's monitor. (Application area Section VI(A)-FIG. 13.)

A second application is a signal compression application to transmit the video to the remote site. This requires the execution of the algorithm at the video transmitter and at the video receiver's side. (Application area VI(B)-FIG. 14.)

A third application is a signal component tracking algorithm to track interesting parts of the video. (Application area VI(C)-FIG. 15.)

G. Product Testing in Production Line

One application is a signal preprocessing application to decrease the testing time of individual products. In a production line typically the quality of a batch of products is determined by sampling the batch and testing the samples. The testing can be very time consuming, such as wear out tests, which delays the entire batch of products. The pattern completion and noise filtering capability of the algorithms may enable reduction of the testing time in order to establish the quality of the product. Noise filtering can reduce the required number of repetitions in order to cancel noise. Pattern completion can reduce the number of measurements by completing the not measured values based on the measured values and the learned or built in components of sparse representation. (Application area VI(A)-FIG. 13.)

H. Optical Character Recognition (OCR)

One application is a component recognition application to recognize the letters in an image. The sparse representation contains the basic building curves of characters. These can be learned by providing different character sets to the algorithm, or can be pre-wired. The application can adapt to the user's handwriting simply by providing handwritten character samples to the algorithms. A classifier can be trained on the sparse representation with hand-marked characters to recognize characters with high accuracy. (Application area VI(C)-FIG. 15.)

I. Speech Recognition

One application is a component detection application to recognize the spoken words in a sound signal. The algorithm can adapt to special sounds by the adaptive capabilities of the algorithm. The sparse representation contains the building blocks of sound signals of words. These can be learned by providing different user's speech or can be pre-wired. A classifier can be trained on the sparse representation with hand marked sound signals of words to recognize words with high accuracy. (Application area VI(C)-FIG. 15.)

J. EEG HCI/BCI

One application is a component detection application to recognize the intended commands from the user's EEG signals. The signals from the EEG scalp are processed by the algorithm while the user executes the commands to be recognized in a controlled order and with controlled durations. The components of the sparse representation can be pre-wired to fasten the adaptation to average components of many users' commands. The algorithm adapts the components of the sparse representation to the actual user and to the user's commands. A classifier is trained on the sparse representation during practicing. This can be done because the commands are executed by the user in a fully controlled way, and the control is determined by the computer which is connected to the EEG scalp and to the device executing the algorithm. The classifier learns the representations of the commands and recognizes those with high accuracy during normal use, when the executed commands are not controlled by the computer. (Application area V(C)-FIG. 15.)

K. Multi-electrode Implant

This application is the same as the EEG application described immediately above, but this uses a different input device, namely a multi-electrode implant instead of the EEG scalp.

One application is a component detection application to recognize the intended commands from the user's multi-electrode implant in her or his brain. (Application area V(C)-FIG. 15.)

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for parallel adaptive signal reconstruction from a multitude of measurements of an input signal, the method comprising the steps of:
   (a) establishing sparse transforms Q and W to provide a sparse representation of the input signal, wherein the sparse representation of the input signal includes active components of the sparse representation;
   (b) establishing a sparsity measure based on a number of active components of the sparse representation;
   (c) using the sparsity measure to establish a sparsity constraint determining whether a sparse code is sparse enough by the sparsity measure;
   (d) establishing a cost function containing the sparsity measure and a correlation quality of reconstruction of the input signal;
   (e) receiving an input signal in the form of n dimensional sampled values;
   (f) calculating a first sparse code by a selection based method (SM), wherein the first sparse code is calculated using non-zero sampled values of the input signal;
   (g) sparsification of said first sparse code;
   (h) calculating using one or more hardware processor a usage rate of the active components of said sparse code;
   (i) calculating using the one or more hardware processor similarity and dissimilarity measures between the active components of said sparse code;
   (j) determining a learning rate for the active components based on the usage rate and similarity and dissimilarity measures of the active components of said sparse code;
   (k) updating said transforms Q and W with said learning rate to decrease said cost function;
   (l) tuning of said transforms Q and W so that the low usage rate components of said sparse code become more frequent; and
   (m) removing values below a predetermined threshold from said transforms Q and W and normalization of said transform Q.

2. The method of claim 1 in which said sparsification of the first sparse code includes truncating to a number of largest magnitude components of said sparse code and by setting the smaller magnitude components of said sparse code to zero.

3. The method of claim 1 in which said input signal is measured by an identity transformation.

4. The method of claim 1 in which said sparse representation comprises significantly less nonzero elements than the dimension of said input signal.

5. The method of claim 1 in which said sparse representation is higher dimensional than said input signal.

6. The method of claim 1 in which said sparse representation is divided into clusters and the number of active components within each cluster is limited by a given number $k_c$.

7. The method of claim 1 in which said transforms Q and W are represented by matrices.

8. The method of claim 1 in which said transforms Q and W have the form of a function f(Mx) where x is a vector to be transformed, M is a matrix and said function f is a nonlinear function acting independently on each component of the result of a matrix multiplication Mx.

9. The method of claim 1 in which said similarity and dissimilarity measures include Euclidean distance, an exponentiated form of Euclidean distance, mutual information between the components, or a suitable approximation of the mutual information, or a temporal variant including time-delayed second order mutual information.

10. The method of claim 1 in which said similarity and dissimilarity measures include conditional or joint probabilities of two components being active at the same time.

11. The method of claim 1 in which for each component of said sparse code a tuning calculation is made as to how well tuned the components are.

12. The method of claim 11 where the tuning calculation is based on an elite cost function threshold, and wherein said elite cost function threshold estimates a threshold for a fixed percent of cost function values which are below the threshold when a given component of said sparse code being tuned is active.

13. The method of claim 11 wherein the tuning calculation is based on a friend list of each component of said sparse code, and wherein said friend list of one component contains a fixed number of other components of said sparse code with which the one component provides best reconstruction.

14. The method of claim 6 in which the learning rate of each said non-zero active component of said sparse code is determined by pair-wise mutual information (PMI) values within each said cluster, wherein if a component of said sparse code has a smaller average pair-wise mutual information value within its cluster than the average PMI value within its cluster, then its learning rate is higher than the learning rates of other non-zero components of said sparse code.

15. The method of claim 11 in which each learning rate of each said non-zero component of said sparse code is determined by usage rates, said calculated measure of how well tuned each component is, and said similarity and dissimilarity measures.

16. The method of claim 15 in which the learning rates of well tuned components of said sparse code are lower than the learning rates of other components of said sparse code.

17. The method of claim 1 in which the transforms Q and W are tuned by a variant of gradient descent tuning.

18. A method of calculating a sparse code by an iterative selection based method (SM) for selecting active components of the sparse code, where said iterative selection based method (SM) comprises the steps of:
(a) establishing a starting preference for each component of the sparse code to become active;
(b) modifying preferences based on similarity and dissimilarity measures of components of the sparse code;
(c) generating at least one phenotype as a population of phenotypes from said modified preferences;
(d) calculating using one or more hardware processor a cost function of said phenotypes of said population;
(e) establishing an elite set of said phenotypes, containing a given percent of the best phenotypes according to the cost function;
(f) updating the preferences of the components based on said elite set; and
(g) repeating the steps (b)-(f) of said selection based method (SM) until the cost function of the best phenotype is below a given threshold and a sparsity measure of said phenotype satisfies a sparsity constraint or reaches a maximal repetition number.

19. The method of claim 18 in which said generating at least one phenotype as a population comprises the steps of:
(a) selecting active components of said sparse code based on said modified preferences; and
(b) calculating continuous values of said active components of said sparse code to minimize said cost function.

20. The method of claim 19 in which the calculating continuous values includes iterating a variant of the derivative of said cost function that decreases said cost function.

21. The method of claim 20 in which said variant of the derivative of said cost function is a stochastic variant.

22. The method of claim 20 in which said variant of the derivative of said cost function has the form $s(t+1)=s(t)+\alpha(t) Wf(y-Qs(t))$, where s is the continuous values of the active components of said sparse code, y is a signal input to be reconstructed, W and Q are transforms, f is an element-wise nonlinear function, and $\alpha$ is a time dependent tuning rate.

23. A non-transitory computer readable medium architecture for implementing the method of claim 1, comprising:
an input unit for receiving the measured values;
high speed matrix multiplication units to calculate the Q and W transforms;
a reconstruction error calculating unit;
a sparse code updating unit;
a plurality of processor units on which a selection algorithm is run; and
wherein the matrix multiplication units, reconstruction error calculating unit, sparse code updating unit, and the hardware processor units are coupled in a closed loop for generating subsequent iterated sparse codes.

24. The non-transitory computer architecture of claim 23 in which the plurality of processor units is equal in number to the number of components of the sparse representation.

25. The non-transitory computer architecture of claim 23 in which the sparse representation is divided into clusters, and wherein the number of multiplication units for each cluster is sufficient to calculate $k_c$ active components of the sparse representation resulting from transformation of the input signal.

26. The non-transitory computer architecture of claim 25 in which the number of processor units is equal to the number of clusters, and wherein each cluster has a separate processing unit.

27. The non-transitory computer architecture of claim 23 in which each component of the sparse representation reconstructs a fixed part of the input signal, and wherein the whole input signal is reconstructed by the whole sparse representation, wherein each said transform Q and W is represented by a matrix, and wherein the number of multiplication units for each column of the transformation matrix Q or W is sufficient to calculate the part of the reconstructed input signal assigned to said columns.

28. The non-transitory computer architecture of claim 27 in which a given number of columns of the transformation matrix Q in the sparse representation reconstruct the same part of the input signals being in blocks.

29. The non-transitory computer architecture of claim 28 in which each set of the given number of columns is assigned to separate processing units.

30. The non-transitory computer architecture of claim 23 in which said matrix multiplication units, reconstruction error calculating unit, and sparse code updating unit are analogue units.

31. The non-transitory computer architecture of claim 23 in which said matrix multiplication units, reconstruction error calculating unit, and sparse code updating unit are digital units.

32. The non-transitory computer architecture of claim 31 in which said matrix multiplication units store the matrix elements values of the Q and W matrices locally in registers of the multiplication units.

33. The non-transitory computer architecture of claim 31 in which the matrix multiplication units load the actually used matrix values from an on-chip memory.

34. The non-transitory computer architecture of claim 31 in which the matrix multiplication units load the actually used matrix values from an off-chip memory.

35. The non-transitory computer architecture of claim 31 in which the reconstruction error calculation unit comprises registers and said stores in registers the received measured values, the reconstructed values of said received measured values and the reconstruction error.

36. The non-transitory computer architecture of claim 31 further comprising on-chip memory, in which the reconstruction error calculation unit stores in said on-chip memory the received measured values, the reconstructed values of the received measured values and the reconstruction error.

37. The non-transitory computer architecture of claim 31 further comprising off-chip memory, in which the reconstruction error calculation unit stores in said off-chip memory the received measured values, the reconstructed values of the received measured values and the reconstruction error.

38. The non-transitory computer architecture of claim 35 in which the reconstruction error calculating unit comprises a first set of registers storing the received measured values and the reconstructed values of the measured values for calculating subtraction components, and a second set of registers for storing said reconstruction error, in which the result of the subtraction is written to said second set of registers.

39. The non-transitory computer architecture of claim 25 in which the matrix multiplication units have in each dimension of the input signal and in each cluster $k_c$ multiplication units, and wherein the matrix values corresponding to the input dimension and the cluster are stored so that said $k_c$ multipliers can access those values.

40. The non-transitory computer architecture of claim 31 in which the sparse code updating unit comprises registers and stores in said registers the actual sparse code values, the received update for the sparse code, and the newly calculated sparse code.

41. The non-transitory computer architecture of claim 31 further comprising on-chip memory, in which the sparse code updating unit stores in said on-chip memory the actual sparse code values, the received update for the sparse code, and the newly calculated sparse code.

42. The non-transitory computer architecture of claim 31 further comprising off-chip memory, in which the sparse code updating unit stores in said off-chip memory the actual sparse code values, the received update for the sparse code, and the newly calculated sparse code.

43. The non-transitory computer architecture of claim 40 in which the sparse code updating unit includes a register for storing the sparse code update size and a set of multiplier and adder units for calculate a new sparse code, and a first set of registers for storing the actual sparse code and received update for the sparse code, and a second set of registers for storing the new sparse code, in which the result of the multiplication of the received update for the sparse code by the update size and addition to the actual sparse code is storable.

44. The non-transitory computer architecture of claim 23 further comprising a dedicated memory area, in which the similarity and dissimilarity measures are stored in said dedicated memory area.

45. The non-transitory computer architecture of claim 44 in which the dedicated memory area comprises a set of registers.

46. The non-transitory computer architecture of claim 44 in which the dedicated memory area comprises an on-chip memory.

47. The non-transitory computer architecture of claim 44 in which the dedicated memory area comprises off-chip memory.

48. The non-transitory computer architecture of claim 44 in which the processor units store locally similarity and dissimilarity measures between each pair of sparse code components of the same cluster, and store the similarity and dissimilarity measures of sparse code components of different clusters, and in which the processor units corresponding to the same and to the different clusters can access these measures.

49. The method of claim 18 in which the preference of the $i^{th}$ component of the first sparse code is modified by $p_{choose,i} = p_i + \delta f(C_i, p)$, where p is the vector of preferences of components, $p_{choose,i}$ is the modified preference of the $i^{th}$ component, C is a matrix containing the similarity and dissimilarity measures between components, $\delta$ is a modification rate, and f is a functional of C and p.

50. The method of claim 49 in which the first sparse code is divided into clusters, and in which $p_i$ is updated by $\Sigma_D \Sigma_j C_{ij} p_j$, or $\Pi_D \Sigma_j C_{ij} p_j$, or $\Sigma_D \Pi_j C_{ij} p_j$, or $\Pi_D \Pi_j C_{ij} p_j$, where D goes through the sets of indices of components of the clusters and j goes through the indices in D.

51. The method of claim 49 in which C contains the similarity measures between components of the first sparse code as positive numbers, dissimilarity measures as negative numbers, and in which for unrelated components C is 0.

52. The method of claim 1 in which the transforms Q and W of the sparse code are updated by a discretization learning algorithm.

53. The method of claim 1 in which the input signal is preprocessed before being received by the method.

54. The method of claim 53 in which the input signal is preprocessed by an algorithm favoring sparse representation.

55. The method of claim 17 in which the variant is a stochastic variant.

56. The method of claim 52 in which the discretization learning algorithm is one of a soft or hard winner take all algorithm or an independent component analysis.

57. The method of claim 53 in which the algorithm favoring sparse representation is an independent component analysis algorithm.

58. The method of claim 18 in which said starting preferences of components of said sparse code are established based on said transformation W and an input.

59. The method of claim 1 in which said input of the method is the current input signal extended with some functional of previous input signals.

60. The method of claim 59 in which said extension is a concatenation of t previous input signals, where t defines the time depth of the concatenation.

61. The method of claim 59 in which said extension is a concatenation of some convolutions of the input signals.

62. The method of claim 1 in which said similarity and dissimilarity measures include predictive measures of components.

63. The method of claim 62 in which said predictive measure is the parameters of an autoregressive integrating moving average process model.

64. The method of claim 62 in which said predictive measure is a state transition matrix of the sparse representation.

65. The method of claim 62 in which said starting preferences of said components of said sparse code are established based on the already calculated sparse codes of previous inputs and the predictive measures of the components of the sparse code.

66. The method of claim 65 in which said starting preferences are calculated by an autoregressive integrating moving average process model.

67. The method of claim 18 in which said modification of said preferences happens according to a diffusion scheme on the said preferences of the components.

68. The method of claim 18 in which said modification of said preferences is calculated by an autoregressive integrating moving average process model.

69. The method of claim 1 in which said input is a nonlinear transformation of the reconstructed inputs and calculated sparse codes of some previous methods of claim 1.

70. The non-transitory computer architecture of claim 23 further comprising computing units to calculate the modified preferences of components based on the stored similarity and dissimilarity measures and the actual preferences.

71. The non-transitory computer architecture of claim 70 in which the components are clustered and there are separate computing units for each cluster.

72. The non-transitory computer architecture of claim 71 in which the similarity and dissimilarity measures of components of each cluster are stored locally at the computing units of the clusters.

73. The method of claim 19 in which said continuous values of active components are initialized with said estimated continuous values before said continuous value calculation.

74. The method of claim 73 in which said estimated continuous values are modified in a vector toward the calculated continuous values of said active components.

75. The method of claim 73 in which said estimated continuous values are calculated from the input y by a temporally modified W transform.

76. The method of claim 75 in which said temporally modified transform W is modified toward to transform y into the calculated continuous values of said elite phenotypes.

77. The method of claim 73 in which said estimated continuous values are calculated from Wy by further transforming with a transform B.

78. The method of claim 77 in which said transform B is modified toward to transform Wy into the calculated continuous values of said elite phenotypes.

79. The method of claim 1 being used in the processing, denoising, super-resolution, compression, object recognition, object tracking, and component regression of digital or analog signals.

80. The method of claim 18 being used in the processing, denoising, super-resolution, compression, object recognition, object tracking, and component regression of digital or analog signals.

81. The non-transitory computer architecture of claim 23 being used in the processing, denoising, super-resolution, compression, object recognition, object tracking, and component regression of digital or analog signals.

* * * * *